(12) United States Patent
Yohe et al.

(10) Patent No.: US 11,600,009 B2
(45) Date of Patent: Mar. 7, 2023

(54) ALIGNING DATA SETS BASED ON IDENTIFIED FIDUCIAL MARKERS

(71) Applicant: Intuitive Research and Technology Corporation, Huntsville, AL (US)

(72) Inventors: Michael Lee Yohe, Meridianville, AL (US); Andrew Craig Hardwick, Huntsville, AL (US); Kyle Jordan Russell, Huntsville, AL (US); Chanler Megan Crowe Cantor, Madison, AL (US); Charles Thomas Etheredge, Huntsville, AL (US)

(73) Assignee: INTUITIVE RESEARCH AND TECHNOLOGY CORPORATION, Huntsville, AL (US)

( * ) Notice: Subject to any disclaimer, the term of this patent is extended or adjusted under 35 U.S.C. 154(b) by 130 days.

(21) Appl. No.: 17/342,261

(22) Filed: Jun. 8, 2021

(65) Prior Publication Data

US 2022/0392086 A1    Dec. 8, 2022

(51) Int. Cl.
*G06T 7/33* (2017.01)
*G06F 16/23* (2019.01)
*G06N 20/00* (2019.01)
*G06T 7/11* (2017.01)
*G06T 19/20* (2011.01)

(52) U.S. Cl.
CPC ............ *G06T 7/33* (2017.01); *G06F 16/2365* (2019.01); *G06N 20/00* (2019.01); *G06T 7/11* (2017.01); *G06T 19/20* (2013.01); *G06T 2200/04* (2013.01); *G06T 2207/10028* (2013.01); *G06T 2207/10048* (2013.01); *G06T 2207/20081* (2013.01); *G06T 2207/20092* (2013.01); *G06T 2207/30004* (2013.01); *G06T 2207/30204* (2013.01); *G06T 2219/2004* (2013.01); *G06T 2219/2016* (2013.01)

(58) Field of Classification Search
CPC ............ G06T 7/33; G06T 7/11; G06T 19/20; G06N 20/00; G06F 16/2365
USPC ........................................................ 345/419
See application file for complete search history.

(56) References Cited

U.S. PATENT DOCUMENTS

| | | | | |
|---|---|---|---|---|
| 6,438,507 B1 * | 8/2002 | Imai | .......................... | G06T 7/32 702/150 |
| 9,020,301 B2 * | 4/2015 | Morris | .................. | G01S 7/4808 382/293 |
| 10,909,770 B2 * | 2/2021 | Bell | ...................... | H04N 13/156 |
| 2010/0284572 A1 * | 11/2010 | Lukas | .................... | G06V 20/64 340/988 |

\* cited by examiner

*Primary Examiner* — Thomas J Lett
(74) *Attorney, Agent, or Firm* — Workman Nydegger

(57) ABSTRACT

Techniques are disclosed for aligning fiducial markers that commonly exist in each of multiple different N-dimensional (N-D) data sets. Notably, the N-D data sets are at least three-dimensional (3D) data sets. A first set and a second set of N-D data are accessed. A set of one or more fiducial markers that commonly exist in both those sets are identified. Based on the fiducial markers, one or more transformations are performed to align the two sets. Performing this alignment process results in at least a selected number of the common fiducial markers that exist in the two sets being within a threshold alignment relative to one another.

20 Claims, 19 Drawing Sheets

ALIGNING DATA SETS BASED ON IDENTIFIED FIDUCIAL MARKERS

BACKGROUND

With today's computer technology, it is possible to generate numerous different types of data. For example, a depth sensor can be used to generate data representative of a three-dimensional object; a thermal sensor can be used to generate data representative of an object's heat signature; and a low light sensor can be used to generate images so a user can see in the dark. These different sensors and data provide numerous benefits to users. Despite the ongoing improvements in how data is generated and provided to a user, there are still many aspects of data generation, use, and analytics that can be improved. What is needed, therefore, are improved techniques for data generation and analysis.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices (e.g., hardware storage devices, wearable devices, etc.), and methods for aligning fiducial markers that commonly exist in each of multiple different N-dimensional (N-D) data sets. Notably, the N-D data sets are at least three-dimensional (3D) data sets.

In some embodiments, a first set of N-D data (e.g., 3D data) and a second set of N-D (e.g., 3D data) data are accessed. The embodiments identify a set of one or more fiducial markers that commonly exist in both the first set of N-D data and the second set of N-D data. Based on the identified set of fiducial markers, the embodiments perform one or more transformations to the first set of N-D data and/or the second set of N-D data to align the first set of N-D data with the second set of N-D data. Performing this alignment process results in at least a selected number of the common fiducial markers that exist in the second set of N-D data being within a threshold alignment relative to the corresponding common fiducial markers that exist in the first set of N-D data.

Additionally, some embodiments identify (e.g., subsequent to aligning the first set of 3D data with the second set of 3D data) one or more differences that exist between the first set of 3D data and the second set of 3D data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
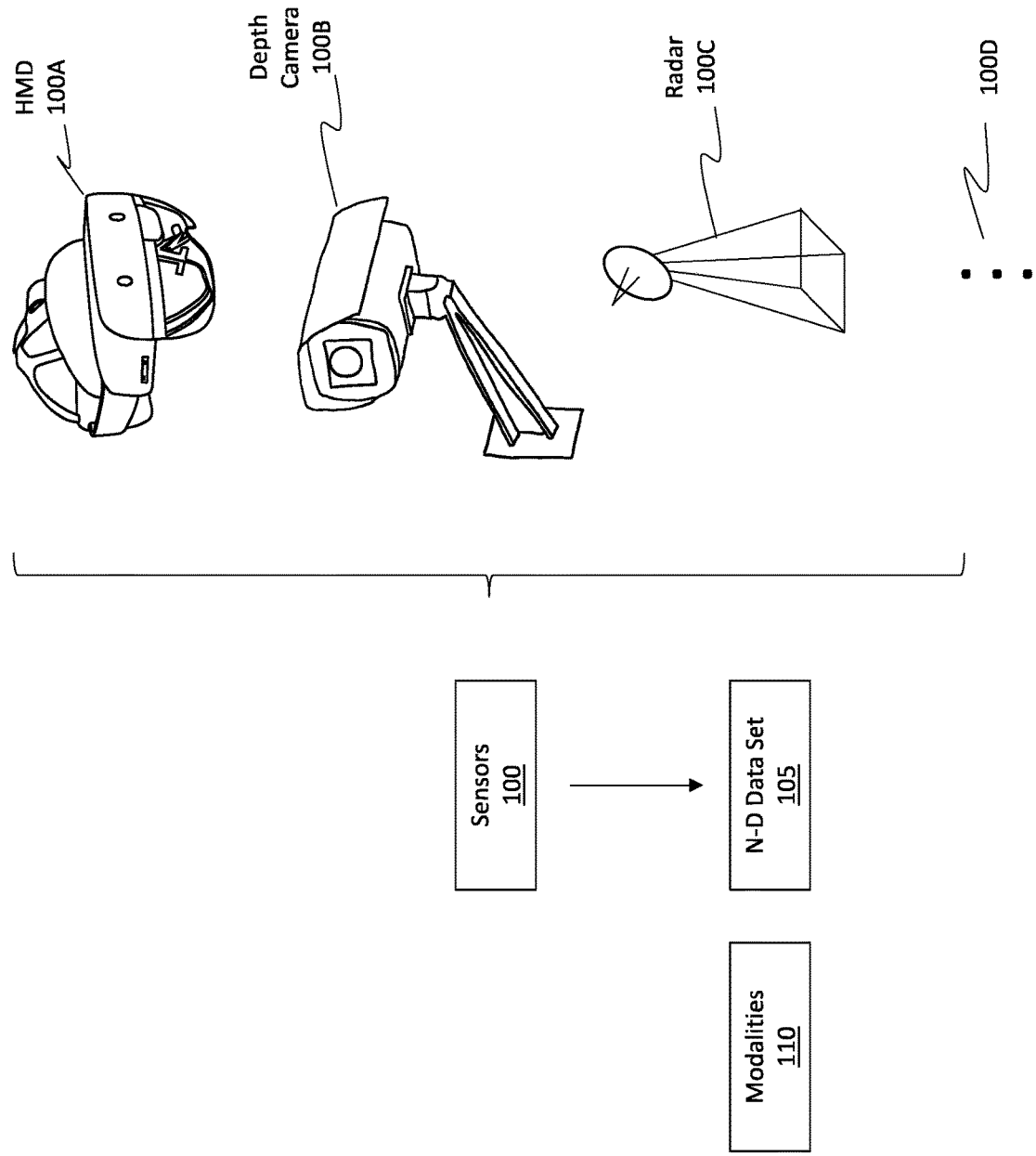
FIG. 1 illustrates different types of sensors and how those sensors can be used to generate data having different dimensions.

Embodiments disclosed herein relate to systems, devices (e.g., hardware storage devices, wearable devices, etc.), and methods for aligning fiducial markers that commonly exist in each of multiple different N-dimensional (N-D) data sets. Notably, the N-D data sets are at least three-dimensional (3D) data sets. As used herein, the phrases "N-D data sets" and simply "data sets" are interchangeable with one another.

In some embodiments, a first set of N-D data (e.g., 3D data) and a second set of N-D (e.g., 3D data) data are accessed. The embodiments identify a set of one or more fiducial markers that commonly exist in both those sets of data. Based on the identified fiducial markers, the embodiments perform one or more transformations to one or both of the sets of data to align them with one another. Performing this alignment process results in at least a selected number of the common fiducial markers that exist in the second set of N-D data being within a threshold alignment relative to the corresponding common fiducial markers that exist in the first set of N-D data.

Additionally, subsequent to aligning the first set of 3D data with the second set of 3D data, some embodiments identify one or more differences that exist between the first set of 3D data and the second set of 3D data.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

The disclosed embodiments bring about numerous improvements and practical applications to the technical field. In particular, the embodiments are designed to generate or access multiple different data sets that supposedly represent the same object or set of objects. These data sets are manipulated or transformed in a manner so that certain identified "fiducial markers" that commonly exist between those data sets are aligned with one another. After this alignment process occurs, the embodiments beneficially identify differences that might exist between those different data sets. One benefit of identifying the differences is that the embodiments are able to detect how an object has changed (e.g., perhaps over time, such as when time series data is used) and/or how an object is viewed in different conditions (e.g., perhaps one data set includes low light data while another data set uses thermal data, different features, characteristics, properties, or attributes will be detectable in those different types of data). In performing such operations, significant benefits can be achieved in the realm of data analytics and understanding. Furthermore, users are benefitted as a result of being provided with enhanced data.

Identifying the orientation and rotation of data sets taken at different times with the same or different subjects is a complex and difficult problem. For example, if an oncologist desired to understand tumor growth or shrinkage, the doctor estimates by evaluating different layers of the same subject (the patient) at different points in time. The variables associated with sensor use, patient orientation, internal organ shifting, etc. requires oncologists to best associate and correlate different regions of the body using slices within a plane (axial, sagittal, or coronal) to compare and contrasts the different points in time.

The disclosed embodiments are beneficially configured to identify virtual fiducials or fiducial markers. In doing so, the embodiments beneficially reduce the amount of time necessary to orient the subject irrespective of that subject's orientation during the image sensor capture. The embodiments also provide a higher degree of precision when examining internal tissue structures enabling oncologists to better gauge the effectivity of treatment.

Another example entails the examination of sensor point cloud data sets where individual points are compared between different subjects to ascertain and classify the kinds of subjects based on the characteristics (virtual fiducials) identified in two or more data sets. The disclosed techniques and methodologies beneficially minimize the differences in distances from markers throughout each evaluated data set. Once the distances are minimized, the data sets are considered to be aligned in close approximation to actual, thereby allowing an analyst to identify and classify differences between those data sets. Additionally, the disclosed methodologies incorporate some beneficial elements to virtual fiducial identification, classification, and alignment, such as (but not limited to): a) enabling data analysts to help orient the algorithms by providing inputs that are easy for human intuition b) enabling the algorithm to identify, classify, and align multiple datasets that can be visualized to data analysts based on previous inputs. Accordingly, these and numerous other benefits will be described throughout the remaining portions of this disclosure.

Generating N-D Data Sets

Attention will now be directed to FIG. 1, which illustrates how different sensors 100 can be used to generate different types of data sets. Although the current discussion is focused on devices that "sense" conditions to generate data, one will appreciate how other devices can be used to generate data as well, such as servers, desktops, laptops, and so on. Accordingly, this disclosure should not be limited only to sensors, but rather, should be broadly interpreted to include any type of computing device.

The sensors 100 can include, but certainly are not limited to, any type of wearable device (e.g., a head mounted device HMD 100A), such as in the case of virtual or augmented reality devices. The sensors 100 can also include any type of depth camera 100B, such as stereoscopic cameras, time of flight cameras, and so on. The sensors 100 can also include any type of radar 100C device, including satellite imaging, medical devices, communication devices, and so on. The ellipsis 100D represents how any other type of sensor device can be included in the sensors 100.

The sensors 100 are configured to generate different types of data, as shown by the N-D data set 105. The "N" in the N-D data set 105 represents how the data can be of any dimension. For instance, the N-D data set 105 can be a 1D data set, a 2D data set, a 3D data set, or more dimensions than 3. Indeed, the N-D data set 105 can have any dimension. The sensors 100 are able to generate the N-D data set 105. By way of example, the HMD 100A, the depth camera 100B, and/or the radar 100C can be configured to generate 3D data sets.

Different camera/sensor types or "modalities" (e.g., as shown by modalities 110) can also be used. For example, the modalities 110 can include a monochrome camera (or sensor) modality, a visible light camera modality, a low light (e.g., night vision) camera modality, a thermal imaging modality, an ultraviolet camera modality, and so on, without limit. The modality of the camera (sensor) determines what type of image will be generated and how that camera is configured to detect stimuli. For instance, a low light camera detects light photons while a thermal imaging camera detects heat signatures. Accordingly, the sensors 100 can be configured to have any type of modality.

Figure 2:
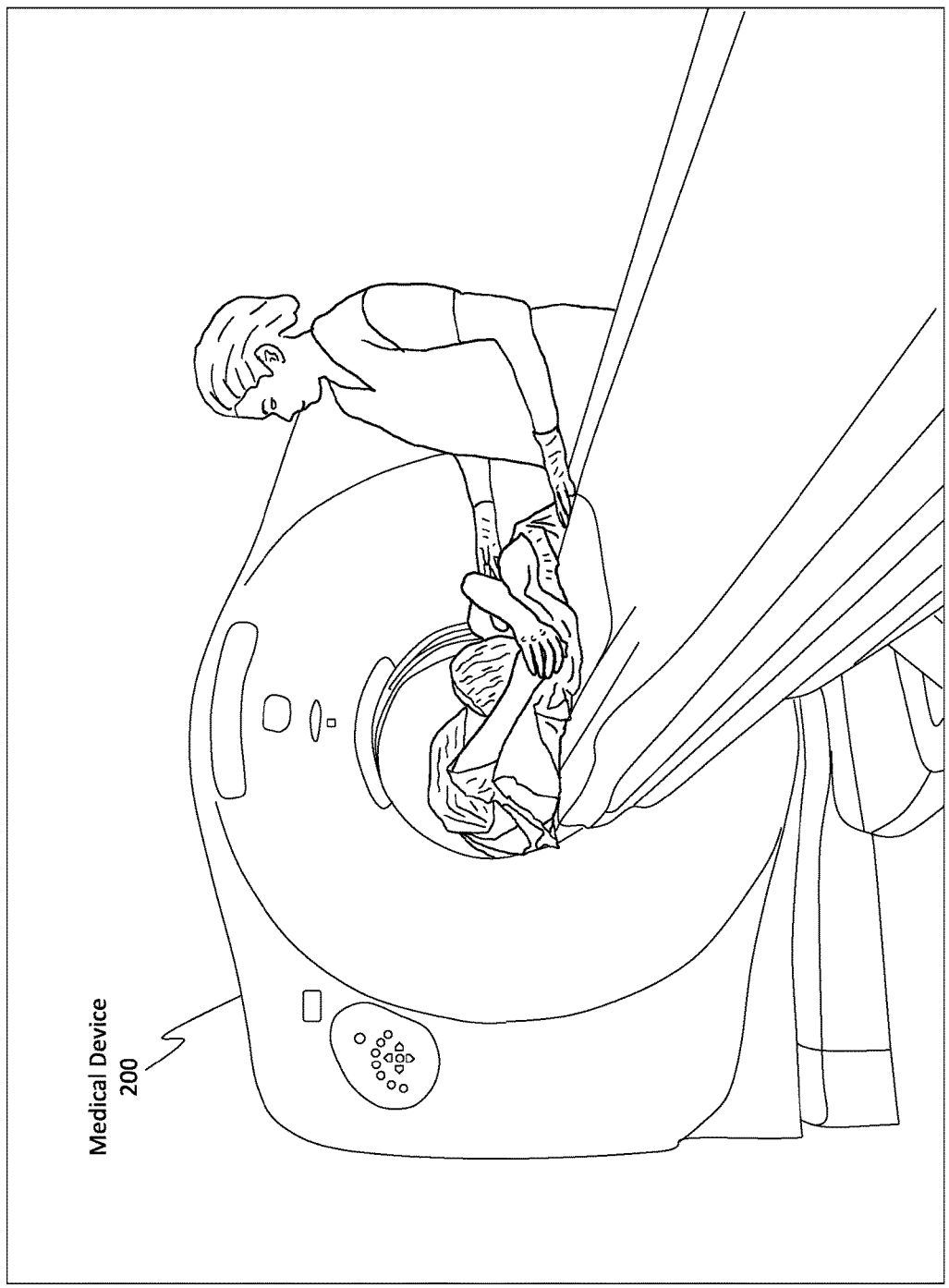
FIG. 2 illustrates one example of a sensor, which is a medical device used to generate medical imagery.

FIG. 2 illustrates one type of sensor mentioned in FIG. 1. Specifically, FIG. 2 shows a medical device 200 in the form of a CT machine. Of course, other types of medical devices can also be used, such as, but not limited to, any type of x-ray machine, MRI machine, and so on. The medical device 200 is able to generate N-D data, as discussed before.

Figure 3:
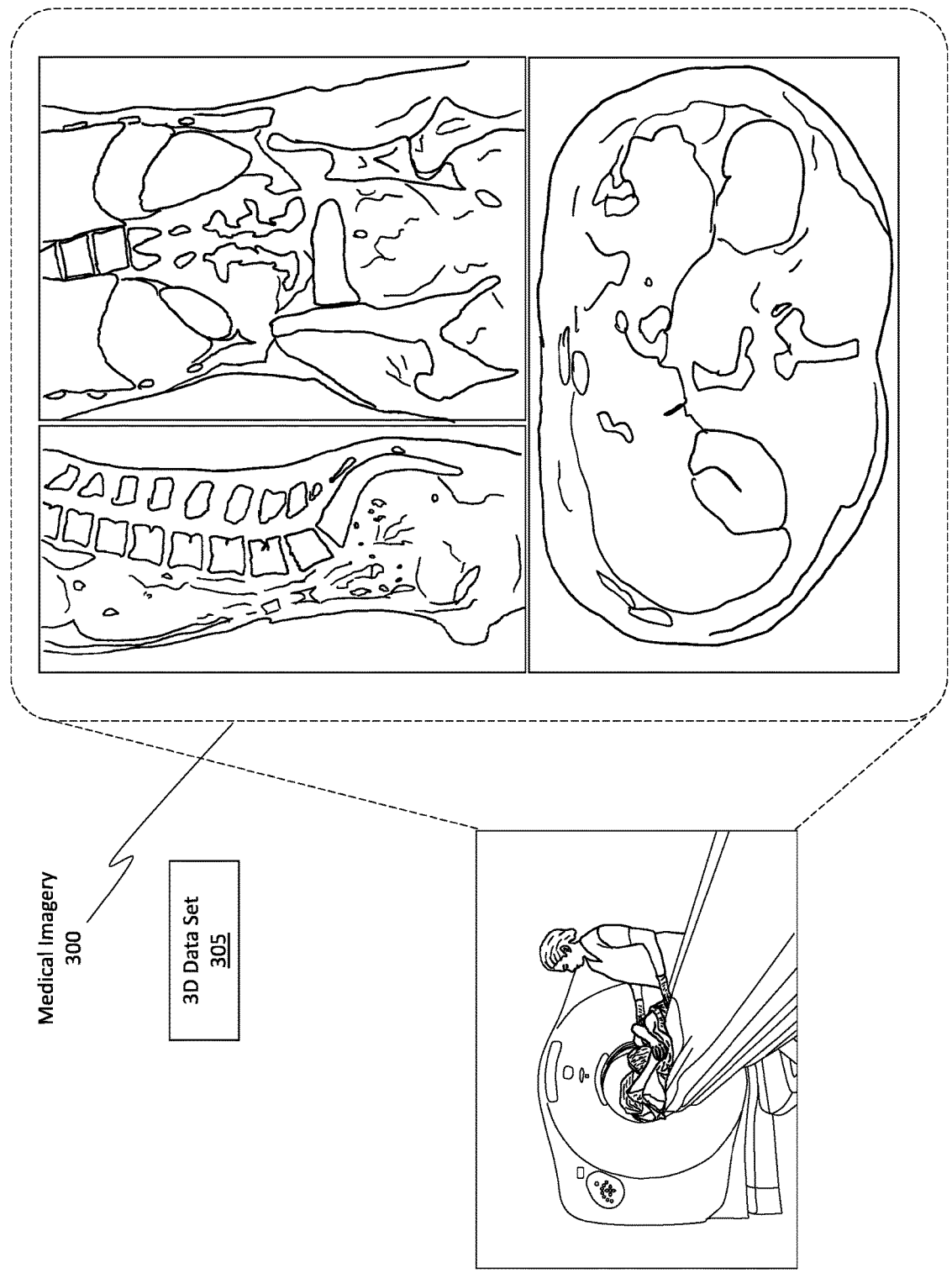
FIG. 3 illustrates how the resulting medical-related data can be in the form of a three-dimensional (3D) data set.

For example, FIG. 3 shows how the medical device 200 of FIG. 2 is able to generate medical imagery 300. In this example case, the medical imagery 300 is a 3D data set 305, though the generated data can have more or less dimensions than 3.

Figure 4:
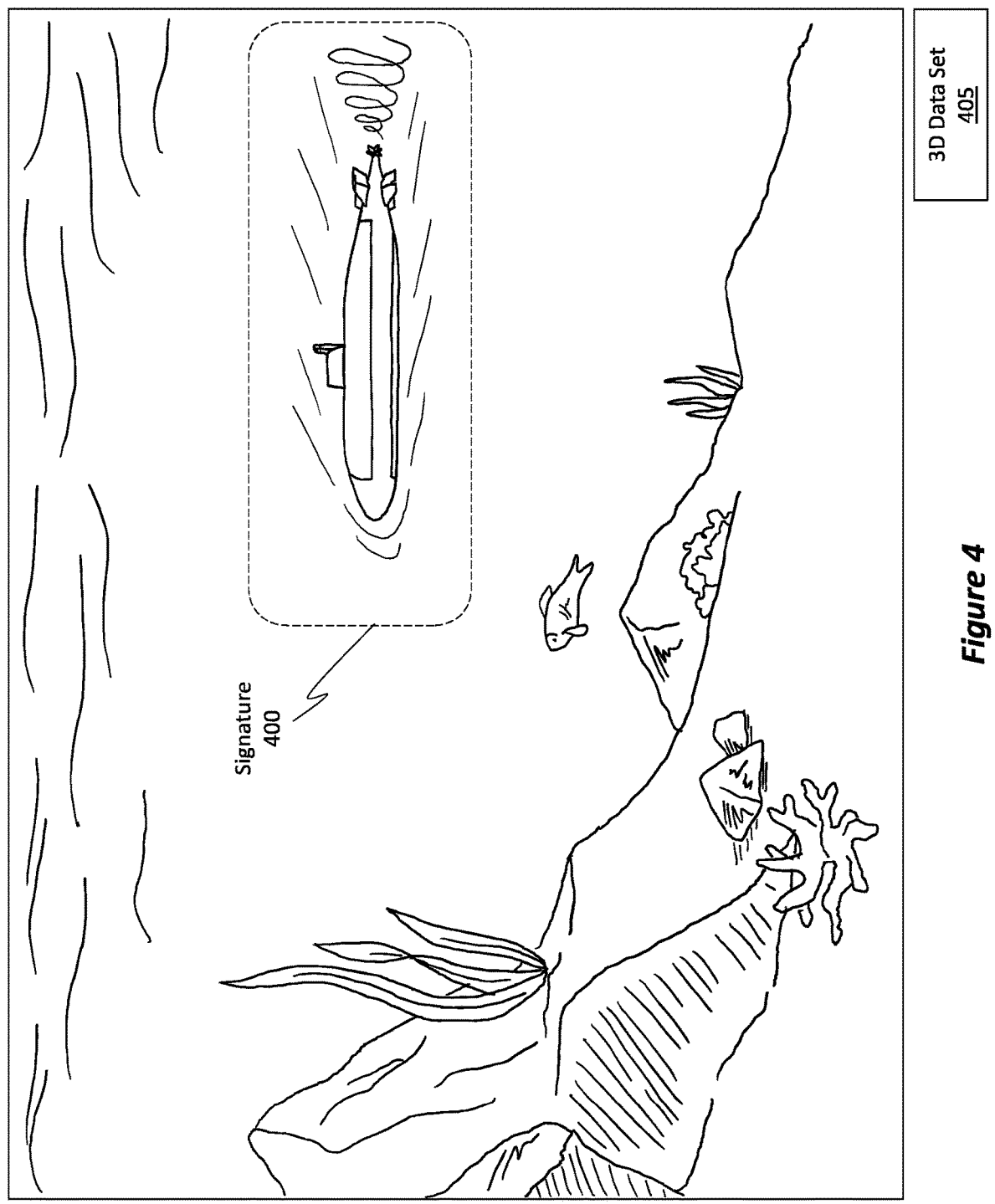
FIG. 4 illustrates how a 3D data set can be generated to represent the flow or wake signature of an underwater vessel.

The sensors 100 from FIG. 1 can be used to generate other types of data as well. For example, FIG. 4 shows how the sensors 100 can be used to detect a signature 400 (e.g., a thermal signature, a disturbance signature, etc.) of any type of object (e.g., a submarine, boat, etc.). The resulting data that is produced from a sensor scanning or detecting the signature 400 can be a 3D data set 405.

Figure 5:
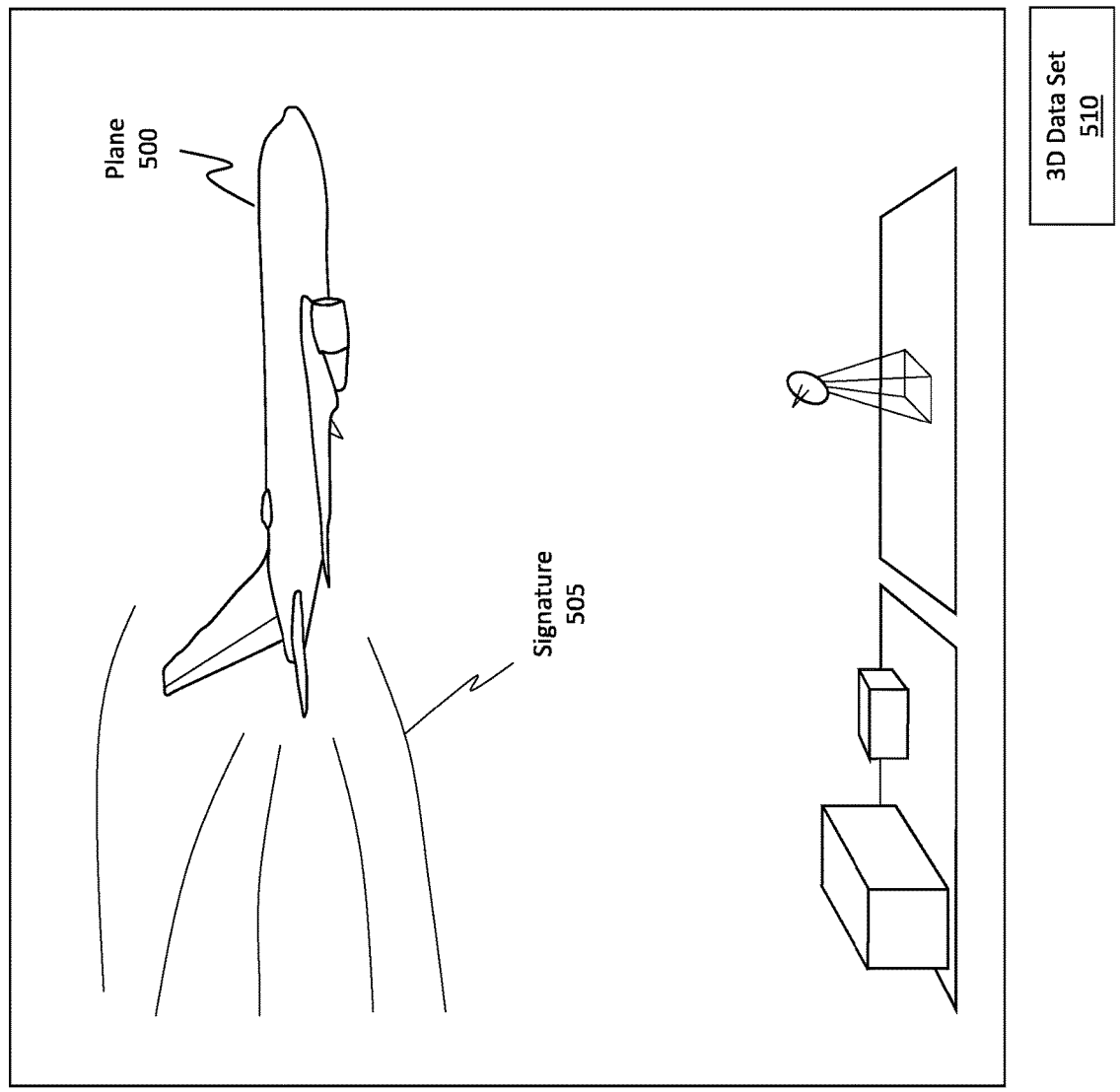
FIG. 5 illustrates how a 3D data set can be generated to represent the movement signature of an airplane.

FIG. 5 shows how a plane 500 can also have a signature 505. That signature 505 (e.g., thermal, environmental, gas particle, etc.) can be detected using the sensors 100 from FIG. 1 to generate a 3D data set 510.

Figure 6:
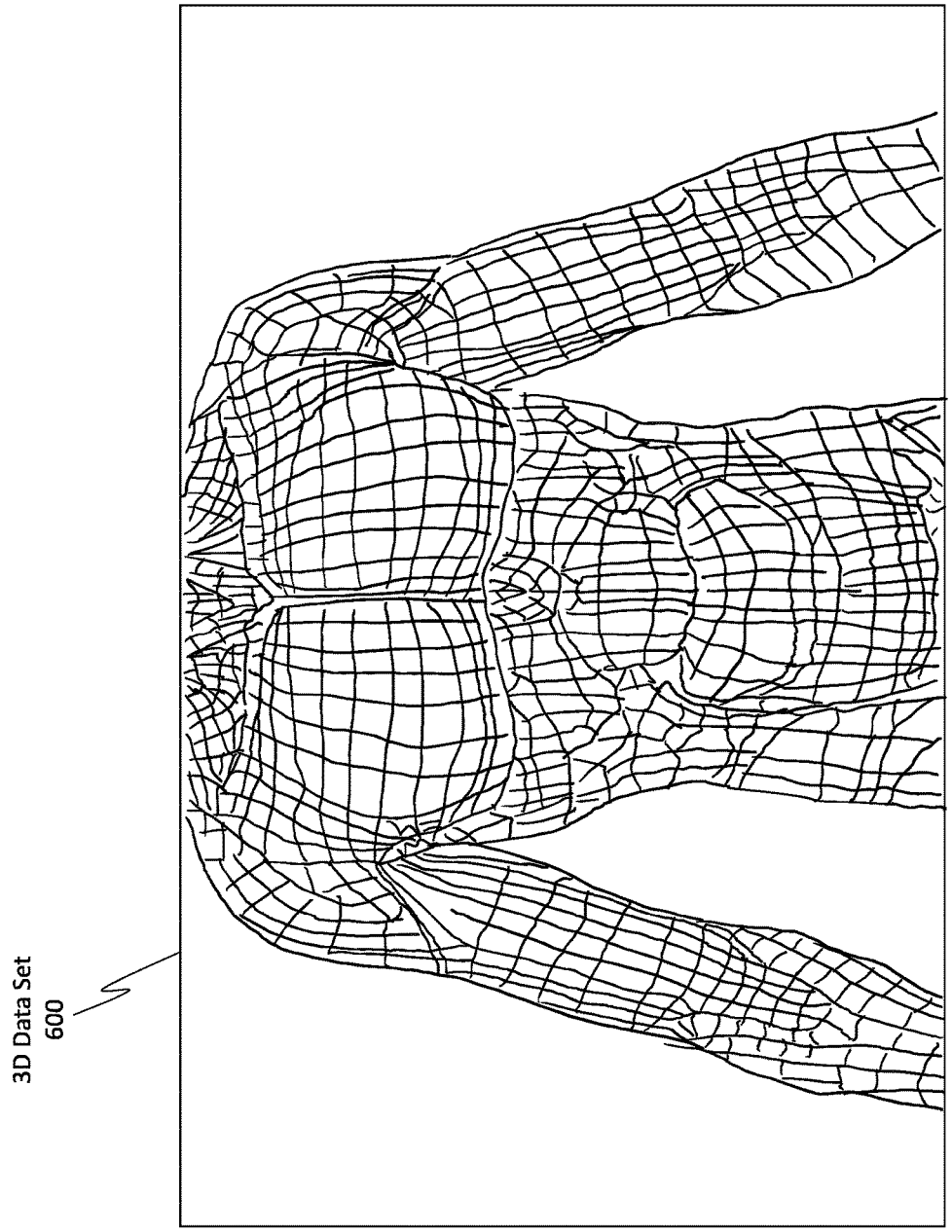
FIG. 6 illustrates how a 3D data set can be generated to represent the features and contours of a human's body.

FIG. 6 shows yet another example where a 3D data set 600 is generated using the sensors 100 of FIG. 1. In particular, FIG. 6 shows a surface reconstruction mesh of a person's body, where the mesh shows the 3D contours and features of the person's body. Accordingly, sensor data can be captured or data can be generated, where the data can have any dimension or size. Further details are shown in FIG. 7.

Figure 7:
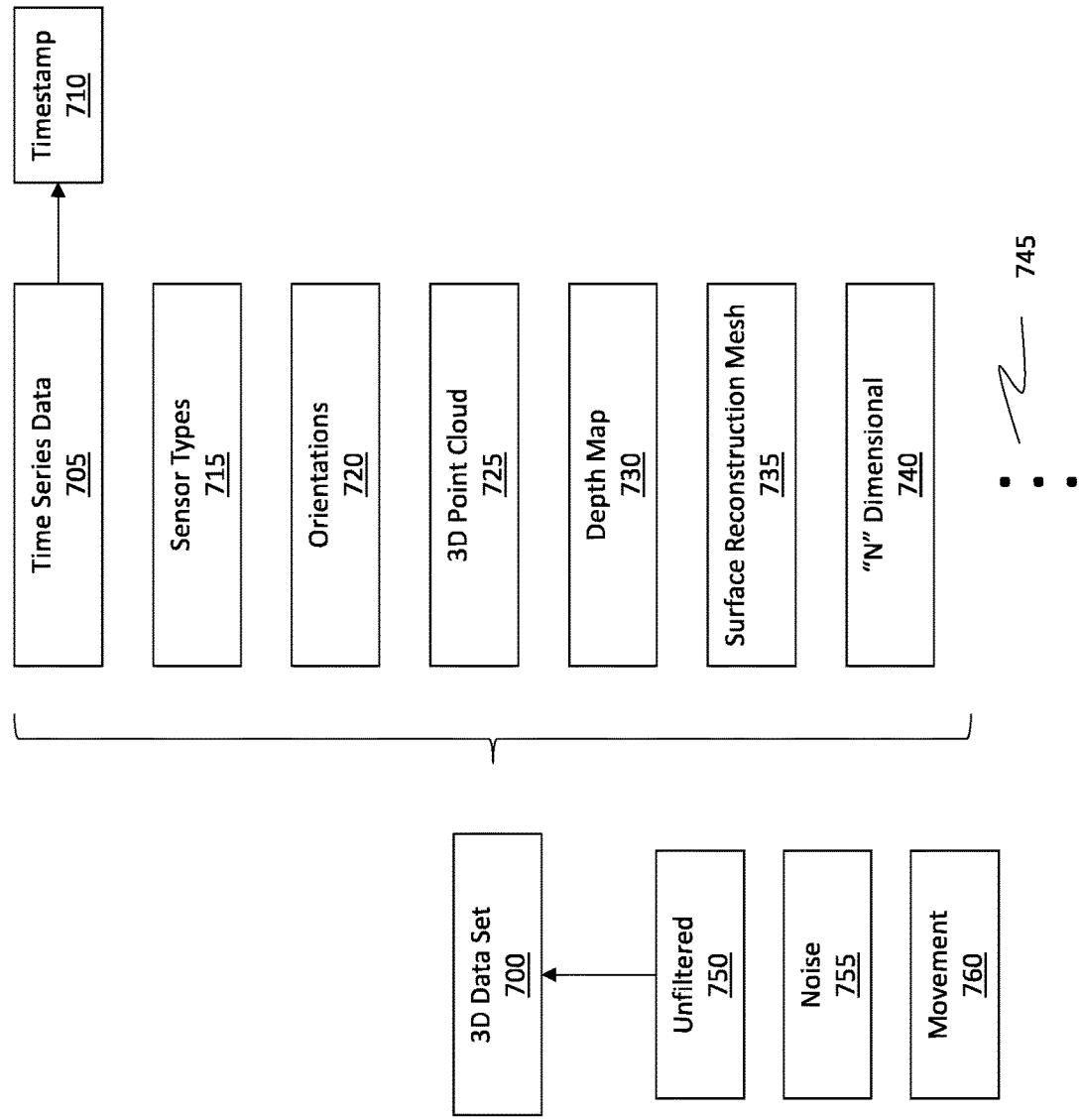
FIG. 7 illustrates how 3D data sets can have different properties, characteristics, or attributes.

FIG. 7 shows an example 3D data set 700, which is representative of the 3D data sets mentioned thus far. The structure or type of data included in the 3D data set 700 can vary, as shown by FIG. 7. Although the discussion surrounding FIG. 7 is primarily focused on three-dimensional data sets, one will appreciate how the discussion is also applicable to data sets having other dimensions. As such, the disclosed principles should not be limited only to three-dimensional data sets.

In some implementations, the 3D data set 700 is comprised of time series data 705, where different data sets have different timestamps, as shown by timestamp 710. For example, consider a scenario where a medical device is being used to examine a person. The medical device is able to generate one set of data at a first time stamp and a second set of data at a second time stamp. The time difference can be milliseconds, seconds, minutes, hours, days, months, or perhaps even years. Often in this scenario, the same device (or a similar device, such as the same type of device) is used to generate the data sets, where those data sets are separated in time. Accordingly, in some scenarios, the 3D data set 700 comprises time series data 705, which is data that is generated at different points in time. The generated data sets generally represent the same object or set of objects as well.

In some cases, the 3D data set 700 can be generated by different sensor types 715. As an example, consider a scenario where a device (or multiple devices) includes both a low light camera and a thermal imaging camera. In this scenario, the two different cameras can be aimed in the same direction such that they capture the same content. Optionally, the two different cameras can be time synced so they generate images having the same timestamp. As an alternative option, the two cameras can generate images asynchronously relative to one another. In any event, the sensor types 715 reflects a scenario where two or more cameras or devices are generating different data sets. The data sets reflect the same objects but are generated in different manners and optionally include different types of data.

In some implementations, multiple different cameras or devices can generate data sets of a common object, and those different devices can be at different orientations 720 relative to one another and to the object. In this example case, therefore, the different data sets might reflect different portions of the object or at least be generated from different locations relative to one another. In some cases, the devices can be moved so that the entirety of the object can be represented three-dimensionally. For example, consider a depth sensor that can be used to generate a surface reconstruction mesh of an object. The depth sensor can be moved around the object in order to generate a full rendition of the object. In some cases, multiple depth sensors can be used and moved around the object. Those sensors can each generate a respective surface reconstruction mesh or, alternatively, they can work in collaboration to generate a single, comprehensive surface reconstruction mesh.

The 3D data set 700 can take the form of a 3D point cloud 725, a depth map 730, and/or a surface reconstruction mesh 735. Of course, the 3D data set 700 can take on other forms as well, such as multi-dimensional arrays and so forth. Furthermore, although the 3D data set 700 specifically mentioned three dimensions, the data can be "N" dimensional 740. The ellipsis 745 demonstrates how the 3D data set 700 can have other forms or properties as well.

In accordance with the disclosed principles, the embodiments actively refrain from filtering or removing data from the 3D data set 700, meaning that the data is unfiltered 750. That is, even when there might be noise 755 in the data or if the object moved (e.g., movement 760) while the data sets were generated, the embodiments refrain from filtering the 3D data set 700. Further details as to why this is the case will be provided later, but a quick example will be helpful at this time.

Suppose the 3D data set 700 is a time series set of data. Further suppose the data is medical imaging data of a patient who is periodically being tested to determine whether a tumor is growing. The data sets are generated over time. By analyzing the data sets, one can determine whether the tumor is growing, shrinking, or staying the same size over time. If the data were filtered, however, then there is a chance that the size of the tumor might be mischaracterized or filtered in some manner, thereby leading to potentially incorrect or false diagnoses. As such, the embodiments purposefully refrain from filtering out data from any of the data sets, even if there is a chance that data includes noise. During a later process, the embodiments can perform a classification operation in order to determine what any differences between the data sets might represent. Further examples and details will be provided later.

Identifying Fiduciary Markers

Figure 8:
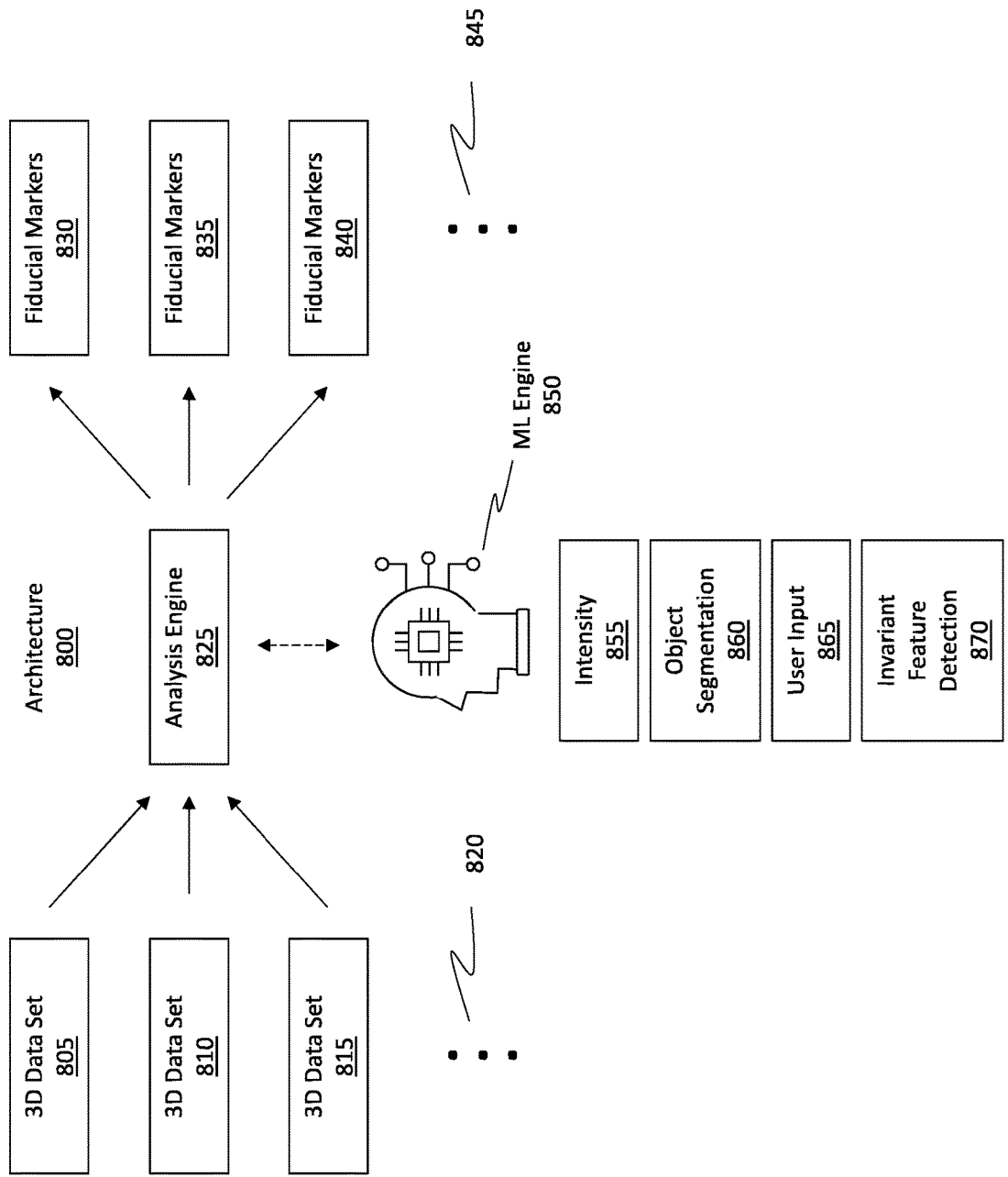
FIG. 8 illustrates an example architecture that is configured to identify fiducial markers that commonly exist between multiple data sets.

FIG. 8 shows an example architecture 800 that is configured to identify "fiducial markers" within a data set. As used herein, the phrases "fiducial markers," "anchor points," and "feature points" are interchangeable with one another. Generally, a fiducial marker is a point of interest that provides a clear contrast with other points in a data set or that is a specific, identifiable portion of an object. For example, data points representative of an edge, a corner, a particular organ, or any other distinguishable marker can be considered as fiducial markers.

Notably, the embodiments are able to generate multiple N-D data sets of a common object or set of objects (e.g., perhaps an environment that includes multiple objects). Furthermore, the embodiments are able to identify fiducial markers that commonly exist between all of those data sets.

As an example, suppose two 3D data sets are generated of a person's insides (e.g., that person's organs). The data sets can be time series data; or the data sets can be generated by different sensors; or the data sets can be generated from different orientations; and so on as discussed previously. The embodiments are able to analyze these different data sets and identify fiducial markers that commonly exist between those data sets. That is, because the multiple different data sets are of the same object, then those data sets should include common data points, some of which can be labeled as fiducial markers. Some of the later figures will provide additional examples.

In any event, the architecture 800 of FIG. 8 shows how multiple data sets, such as 3D date set 805, 3D data set 810, and 3D data set 815 (the ellipsis 820 indicates more than three data sets can be used as well) can be provided as input to an analysis engine 825. These data sets all represent the same content or object.

The analysis engine 825 is structured to analyze the multiple different data sets and identify points that are common between each of those data sets. Some or all of those common points can be labeled as fiducial markers and are shown by fiducial markers 830, 835, and 840 (the ellipsis 845 demonstrates how more fiducial markers can be identified if more data sets are provided as input).

The fiducial markers 830 can be associated with the 3D data set 805; the fiducial markers 835 can be associated with 3D data set 810; and the fiducial markers 840 can be associated with the 3D data set 815. In some instances, the analysis engine 825 generates only a single set of fiducial markers instead of different sets associated with the different data sets. For instance, the fiducial markers 830, 835, and 840 might all generally be the same data because the analysis engine 825 identifies fiducial markers that are common between the 3D data sets 805, 810, and 815. Therefore, in some cases, only a single set of fiducial markers might be generated, where that single set is associated with all of the 3D data sets 805, 810, and 815.

In some implementations, the analysis engine 825 incorporates or uses a machine learning engine 850 or algorithm. Any type of ML algorithm, model, machine learning, or neural network may be used to identify fiducial markers. As used herein, reference to "machine learning" or to a ML model or to a "neural network" may include any type of machine learning algorithm or device, neural network (e.g., convolutional neural network(s), multilayer neural network(s), recursive neural network(s), deep neural network(s), dynamic neural network(s), etc.), decision tree model(s) (e.g., decision trees, random forests, and gradient boosted trees), linear regression model(s) or logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some instances, the analysis engine 825 uses guided learning in which user input is received to identify a selected number of fiducial markers, and then the analysis engine 825 identifies additional fiducial markers based on the received input. For example, a human user might identify a specific organ or part of a human's body that is represented by the 3D data sets 805, 810, and 815. Based on that initial understanding of what the 3D data sets 805, 810, and 815 represent, the analysis engine 825 can then proceed to identify other fiducial markers in those data sets. As an example, the user can identify and label a human's navel or a specific organ. Once that basepoint has been identified, then the analysis engine 825 can determine what the other portions of data represent and can identify fiducial markers.

In some cases, the analysis engine 825 identifies fiducial markers by analyzing intensity 855 values associated with the different data points in the 3D data sets 805, 810, or 815. For instance, the pixels or voxels included in the data sets might be associated with a particular intensity value, and the intensities can be compared and contrasted across the different data sets. Intensities that are sufficiently close to one another in value (e.g., being within a predetermined threshold value of one another) might be determined to represent the same content and thus can be classified as being a "common" fiducial marker between the multiple data sets.

In some cases, the analysis engine 825 identifies fiducial markers using object segmentation 860. Object segmentation 860 generally refers to computer vision or object recognition and classification. Objects that are embodied within a data set can be identified and recognized using machine intelligence. Because each data set might represent the same object(s), the data sets can be analyzed using object segmentation 860 to identify fiducial markers.

In some implementations, as discussed previously, the analysis engine 825 might use user input 865 as a guide or as input in order to identify fiducial markers. In some cases, the analysis engine 825 might rely on invariant feature detection 870 to identify fiducial markers.

Figure 9:
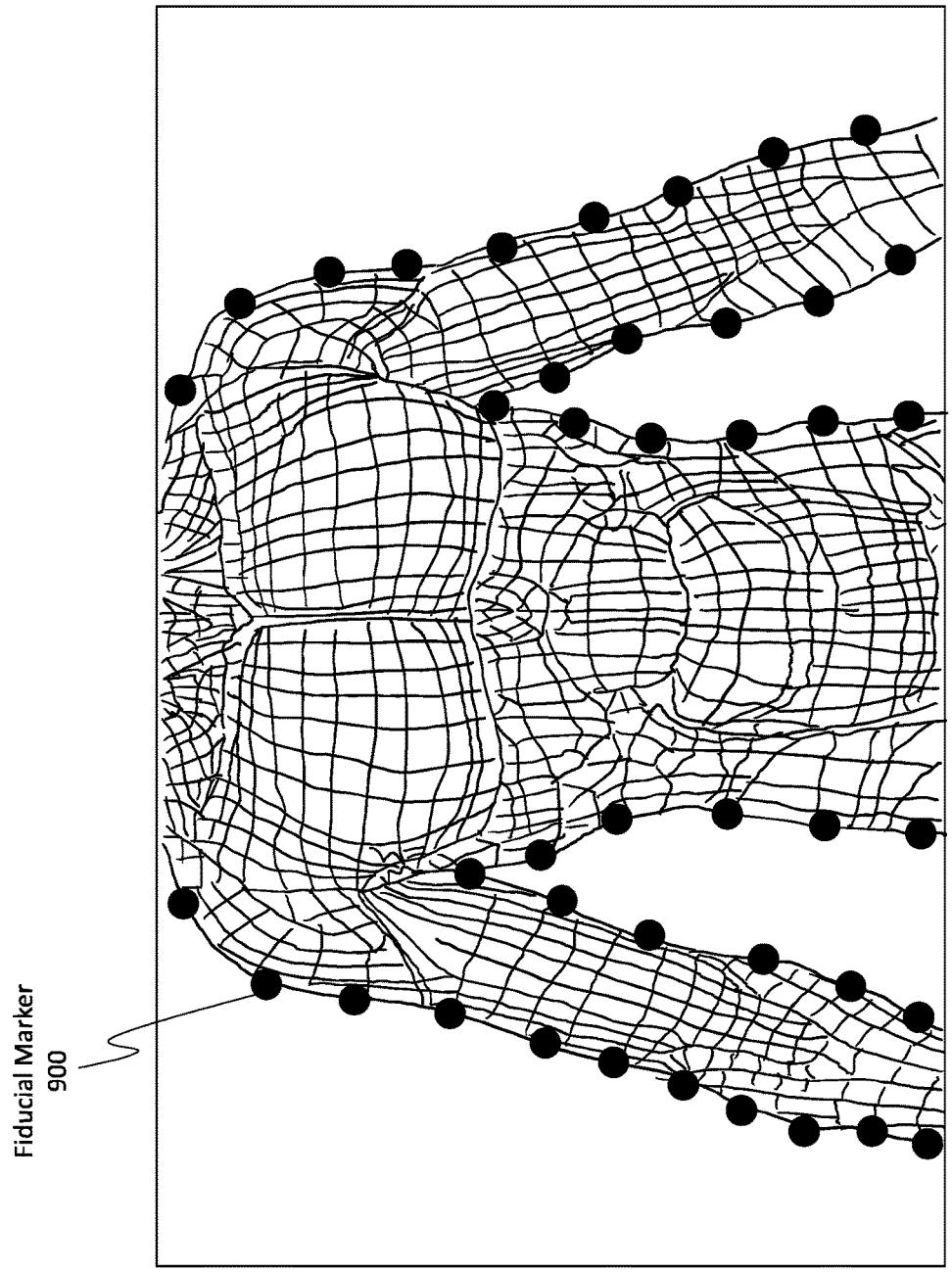
FIG. 9 illustrates various examples of fiducial markers.

FIG. 9 shows one example in which a number of fiducial markers (e.g., fiducial marker 900) have been identified in an N-D data set. Any number of fiducial markers can be identified. For instance, 1, 2, 3, 4, 5, 6, 7, 8, 9, 10, 20, 30, 40, 50, 60, 70, 80, 90, 100, 200, 500, 1,000, 10,000, 100,000, 1,000,000, or more than 1,000,000 fiducial markers might be identified in an N-D data set.

Aligning N-D Data Sets

In accordance with the disclosed principles, the embodiments are able to perform any number of transformations to one or more of the N-D data sets in order to align those N-D data sets with one another. That is, the embodiments are able to modify or transform the entire data set (as a whole), without losing any data integrity, so that the identified fiducial markers are aligned with one another (e.g., are positioned relative to one another so that at least a selected number of fiducial markers are within a threshold distance of one another). FIGS. 10 through 12D illustrate these transformation and alignment processes.

Figure 10:
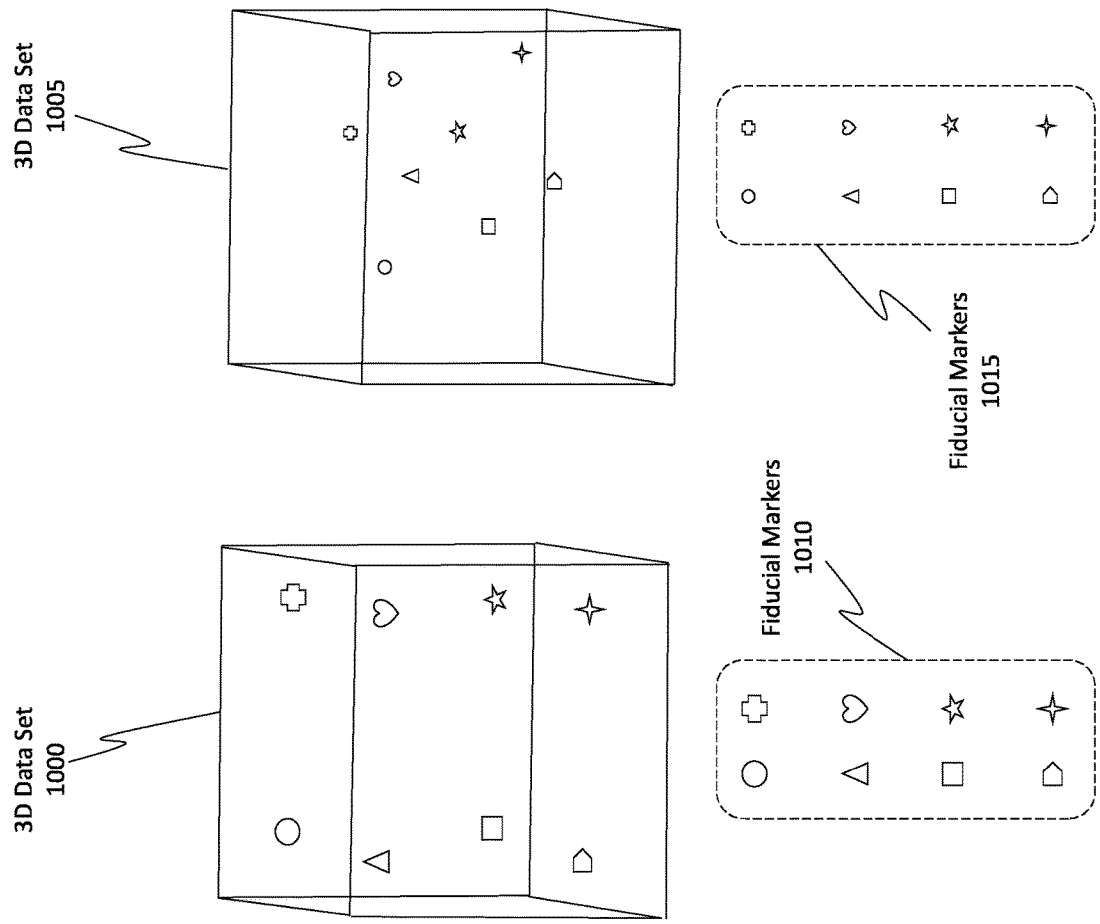
FIG. 10 illustrates how a set of fiducial markers can be commonly represented within multiple different data sets.

FIG. 10 shows two 3D data sets 1000 and 1005. The 3D data sets 1000 and 1005 are representative of the N-D data sets mentioned earlier. In some cases, a single device generated both sets, and those sets represent a common object but are separated in time as to when the sets were generated. Alternatively, the sets may have been generated at the same time, perhaps by different devices. In some cases, the 3D data set 1000 and/or the 3D data set 1005 are generated by one or more of a wearable device, a depth sensor, an infrared (IR) sensor, or any type of radar device. Any other device may be used as well. In some implementations, the data sets are 3D point clouds or, alternatively, are surface reconstruction meshes or data or, alternatively, are depth maps or depth map data.

Notice, in their current form, the two data sets are slightly different. For instance, the sizes of the data sets are different and their orientations are different as well. Such differences can occur as a result of the perspective from which the sets were generated, the size or magnification used to generate the sets, or even the type of data that is embodied by the data sets (e.g., thermal data, IR data, monochrome data, etc.). Such differences can also occur as a result of movement of the target object while the data generation was occurring.

In this example, the 3D data set 1000 has been analyzed and a number of fiducial markers have been identified. These fiducial markers are represented in FIG. 10 via the various shapes, such as the circle, triangle, heart, star, and so on. Here, eight fiducial markers have been identified, but one will appreciate how any number can be identified. The fiducial markers 1010 are representative of the fiducial markers identified in the 3D data set 1000.

The 3D data set 1005 has also been analyzed and a number of fiducial markers have been identified. These fiducial markers are also represented by the various shapes. Furthermore, the fiducial markers were determined to correspond to (or be "common" to) the fiducial markers identified in the 3D data set 1000. For instance, the circle fiducial marker in the 3D data set 1005 corresponds to the circle fiducial marker in the 3D data set 1000; the heart fiducial maker in the 3D data set 1005 corresponds to the heart fiducial marker in the 3D data set 100; and so on. The fiducial markers 1015 represent the fiducial markers identified in the 3D data set 1005.

Notice, the orientation and even the size of the fiducial markers in the 3D data set 1005 are different from the orientation and the size of the fiducial markers in the 3D data set 1000. These differences suggest that the two data sets were generated at different times or by different devices or in some other manner resulting in the data sets being different.

It is desirable to align the two (or more) data sets one with another. Once aligned, then the embodiments are able to analyze the aligned data sets to identify differences that exist. These differences can reflect points of interest, such as perhaps the growth of a new tumor in the medical field or perhaps the appearance of some other object or entity (e.g., the appearance of an opponent in a gaming scenario). As an example, suppose a paintball player is playing a game in a low light environment, where the player has both a low light camera and a thermal imaging camera. If the light in the environment is too low, then there is a chance the low light camera might not detect the appearance of an opponent, but the thermal camera will detect the opponent. Therefore, by aligning the data sets and by identifying differences, the embodiments are able to provide various different advantages and benefits to a user.

Figure 11:
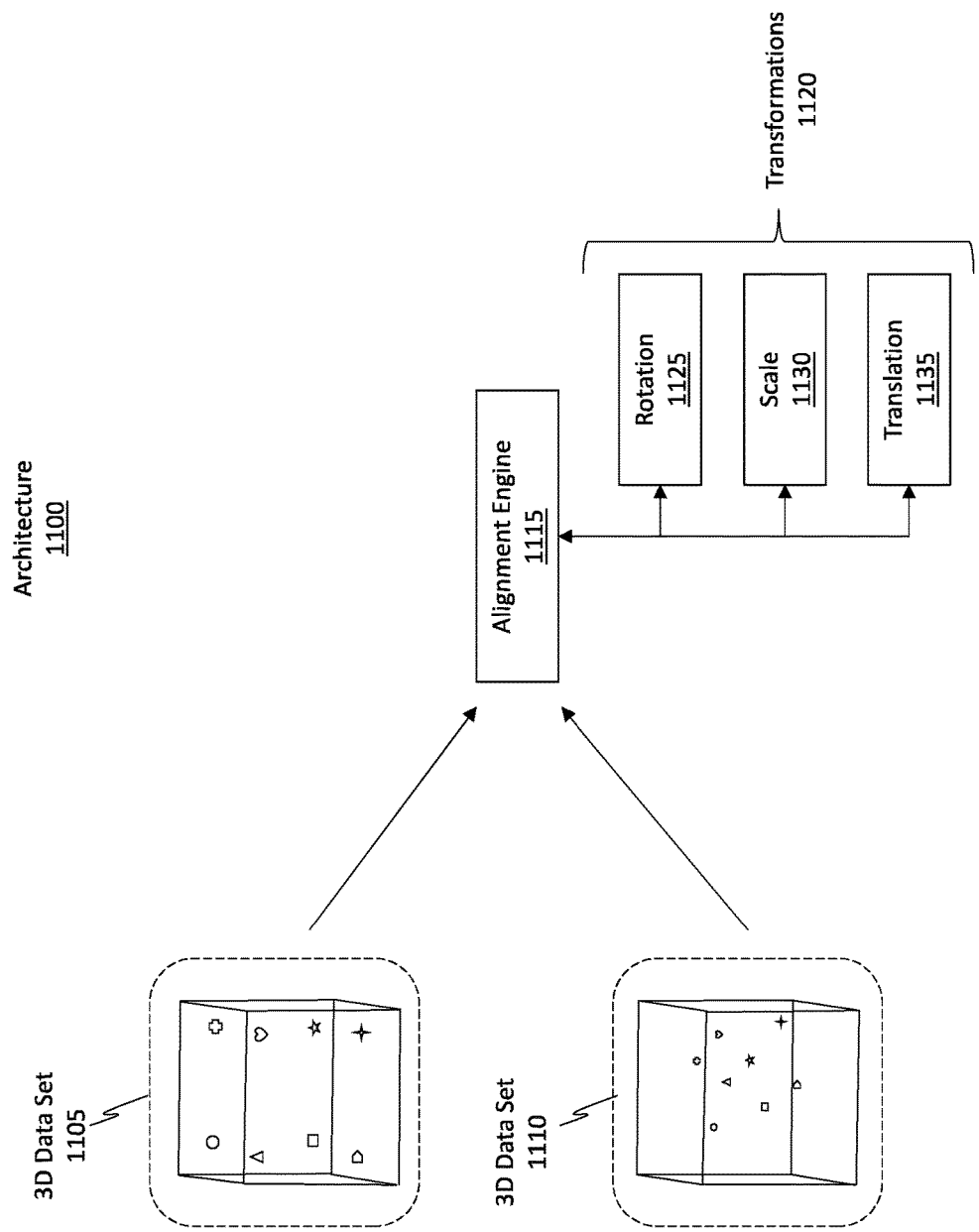
FIG. 11 illustrates another example architecture that has been configured to apply one or more different transformations to one or more data sets in order to align multiple data sets with one another.

FIG. 11 shows an example architecture 1100 that may be used to perform the transformations and alignments mentioned earlier. Initially, FIG. 11 shows a number of data sets comprising 3D data set 1105 and 3D data set 1110. These data sets are representative of the data sets mentioned earlier. It is desirable to align the fiducial markers that are identified from within these data sets with one another.

The 3D data sets 1105 and 1110 are fed as inputs into an alignment engine 1115. The alignment engine 1115 is structured or configured to perform any number of transformations 1120 on one or more of the 3D data sets 1105 and 1110 to bring the previously identified fiducial markers into alignment one with another.

It should be noted that by "alignment" it is meant that a fiducial marker from one data set is within a threshold distance or alignment of a corresponding fiducial marker from a different set. In some cases, the two (or more) fiducial markers will have perfect alignment in that one will be directly overtop of the other. In some cases, the fiducial markers will be offset from one another, but that offset is less than a threshold amount such that those two fiducial markers are still considered to be aligned.

The threshold amount can be set to any value. For example, the threshold amount can be set to a certain number of pixels separating the center regions of the fiducial markers. In some cases, the threshold amount can be based on a relative percentage value that is dependent on the overall size or volume of the data set. Indeed, any threshold determination or value can be used.

The alignment engine 1115 can optionally be designed to attempt to align as many fiducial markers as possible. That is, it is not a requirement that every fiducial marker be aligned with its corresponding fiducial marker in another data set. Instead, the alignment engine 1115 can strive to align a maximum number of fiducial markers. It should also be noted that during the alignment process, no data loss or minimization of data integrity occurs. That is, during the implementation of the transformations 1120, the relative spacing, relative orientation, and relationships of the data points (including the fiducial markers) does not change. Further details will be provided shortly. Accordingly, the alignment engine 1115 strives to achieve maximum alignment between the various fiducial markers, but the alignment engine 1115 is not required to achieve perfect alignment. In some cases, the alignment engine 1115 can be configured to align at least a selected number of fiducial markers, such as one or more but not necessarily all.

The transformations 1120 include, but are not limited to, a rotation 1125 transformation, a scale 1130 transformation, and a translation 1135 transformation. Other transformations can be included in the transformation 1120. The rotation 1125 transformation includes shifting the orientation of a data set around a selected axis. That axis can be selected to be at any position in the 3D data set. The scale 1130 transformation includes modifying the size or magnification of a 3D data set. The translation 1135 transformation includes shifting or reprojecting the position of the 3D data set to a new position relative to an origin. FIGS. 12A through 12D shows examples of various transformations that are applied in order to align multiple data sets. One will appreciate how these illustrations and descriptions are provided for example purposes only and should not be viewed as being binding. For example, although the subsequent examples illustrate an iterative approach for performing transformations, the transformations for a given set of point can be a non-iterative set of calculations, which can then be used to determine a single translation/rotation/scaling operation. As another example, the embodiments are able to search through the available set of fiducial markers to find the minimum transformation delta with the largest number of converging points. Accordingly, the disclosed transformations can occur in as little as 1 step or perhaps in 2 steps, 3 steps, or more than 3 steps.

Figure 12A:
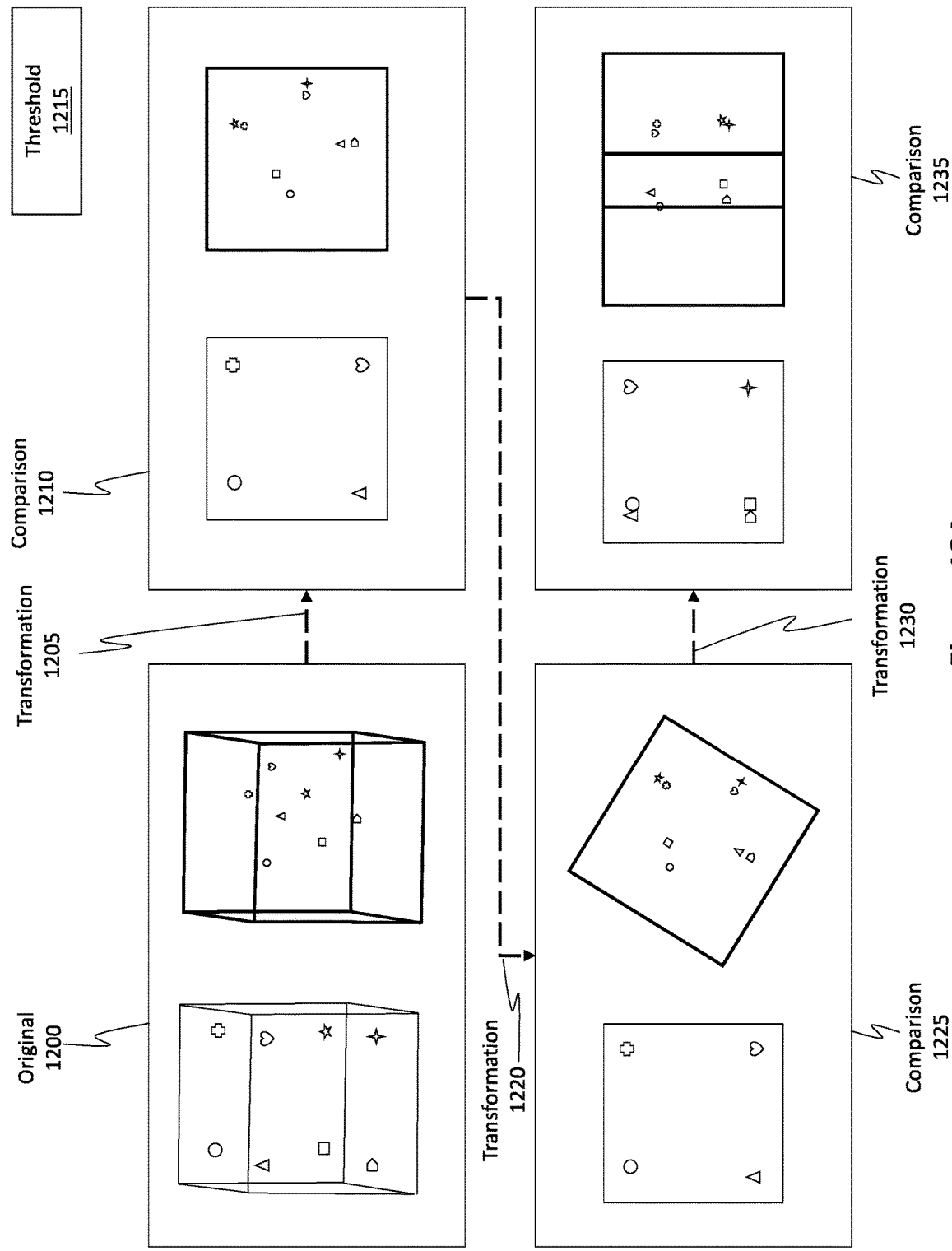
FIGS. 12A, 12B, 12C, and 12D illustrate various transformations that are applied to data sets in order to bring them into alignment with one another.

FIG. 12A initially shows a set of original 1200 3D data sets, as discussed previously. One or more of those data sets is then subjected to one or more transformations, as shown by transformation 1205. The transformation 1205 can include any one or combination of multiple transformations discussed previously. The alignment engine 1115 from FIG. 11 is able to perform these transformations. In this example, the transformation 1205 includes multiple transformations and has been implemented against both of the data sets. For example, it appears as though both data sets have been rotated about different axes in order to present those data sets from a side perspective view.

After performing the transformation 1205, the alignment engine is able to perform a comparison 1210 to determine whether a selected number or proportion of the fiducial markers align with one another, where the alignment is based on a threshold 1215 (e.g., the fiducial markers are located within at least specified distance threshold relative to one another).

If the selected number of fiducial markers are not yet aligned, then the alignment engine performs another set of one or more transformations, as shown by transformation 1220 and then another comparison 1225. In this case, the transformation 1220 includes a rotation transformation applied against the right-hand data set.

The process can continue, as shown by transformation 1230 and comparison 1235. As discussed previously and as shown in FIG. 12A, the transformations include various rotation transformations, scaling transformations, and translation operations.

Figure 12B:
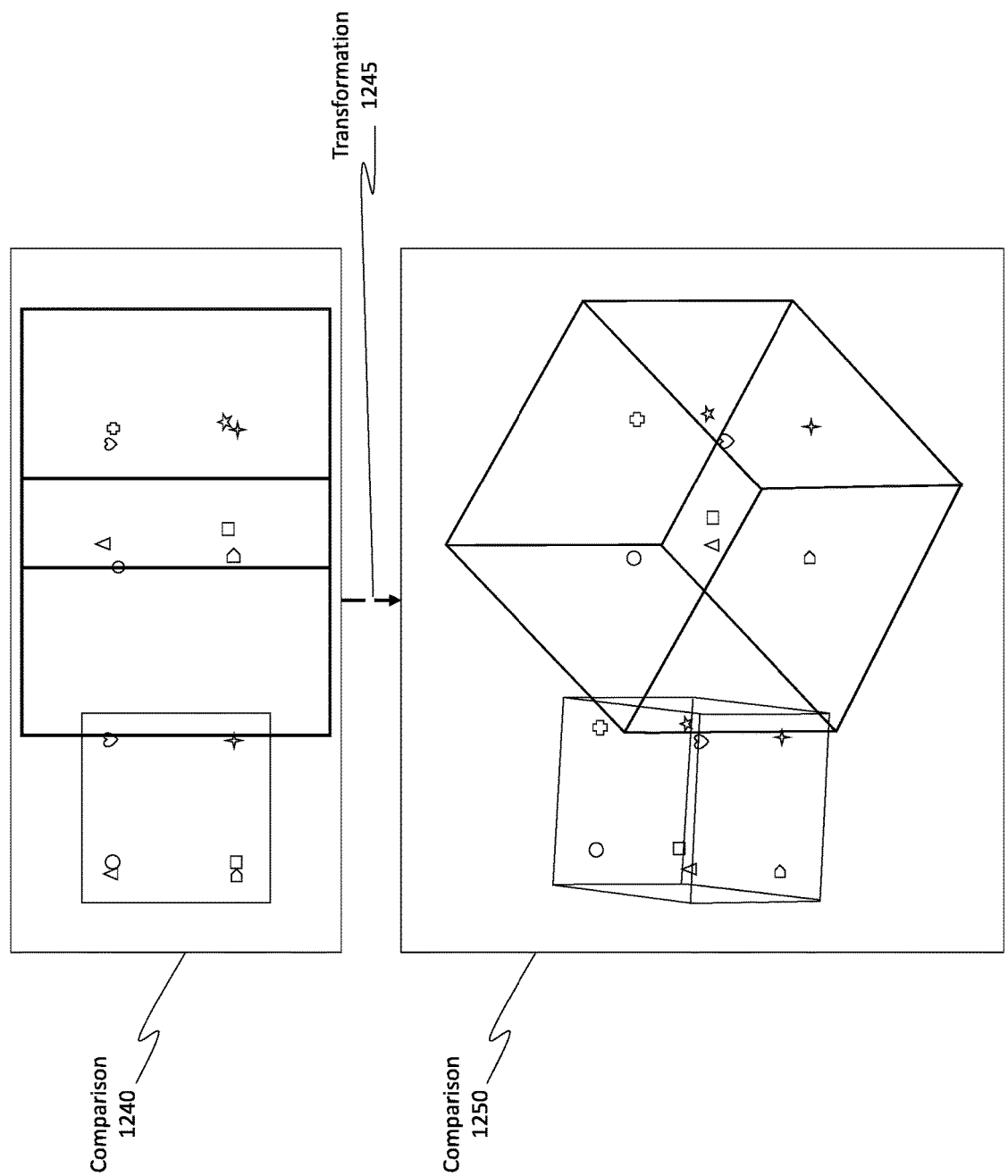

The alignment process continues in FIG. 12B where, after another set of one or more transformations (e.g., a scaling transformation has been performed here to enlarge the right-hand data set), the alignment engine performs another comparison 1240 to determine whether the fiducial markers are aligned. If not, then the alignment engine performs another transformation 1245 and another comparison 1250.

Figure 12C:
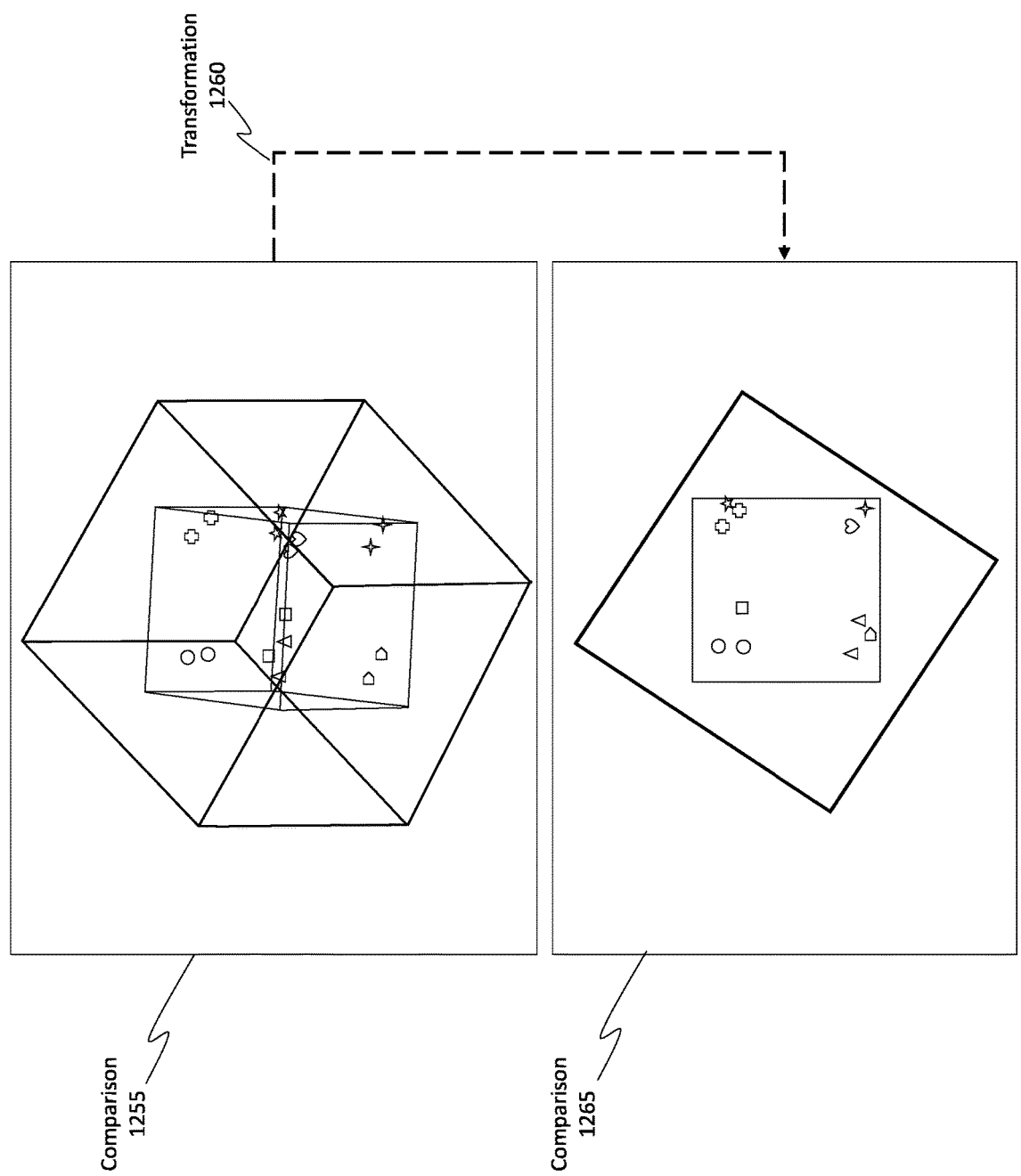

The process continues in FIG. 12C where, after another set of one or more transformations, the alignment engine performs another comparison 1255. Another transformation 1260 and another comparison 1265 are then performed.

Figure 12D:
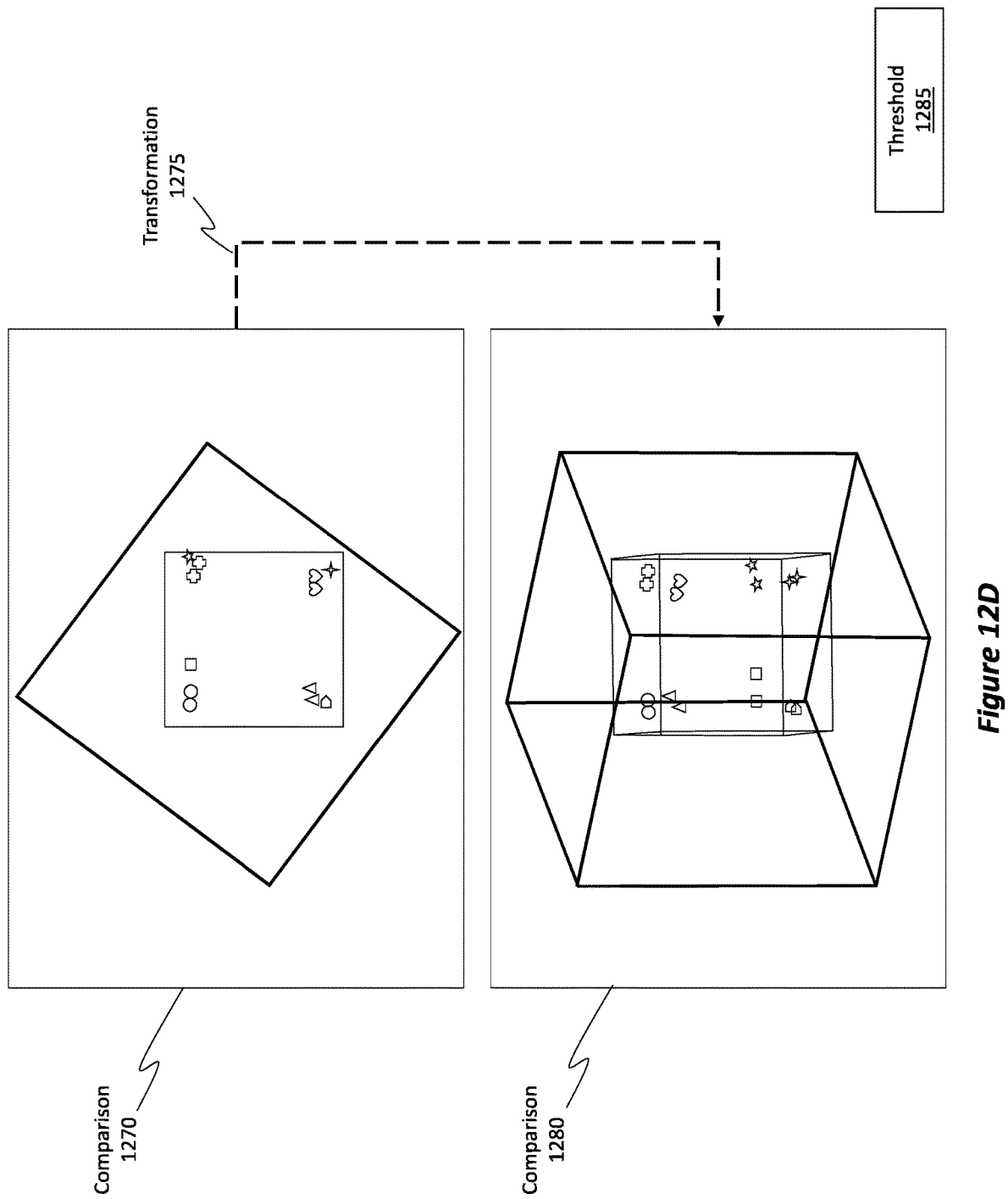

After another transformation, the alignment engine performs another comparison 1270 in FIG. 12D and then another transformation 1275. Finally, in the comparison 1280, the alignment engine has determined that a sufficient or threshold number of fiducial markers are aligned in that they are within a threshold 1285 distance or alignment relative to one another. For instance, in the illustration shown in FIG. 12D, one can observe how the circles from the two data sets are aligned (e.g., positioned sufficiently proximate to one another). The other seven fiducial markers are also aligned one with another in 3D space. Accordingly, the embodiments are able to perform any number of transformations and comparisons in order to bring one or more data sets into alignment with another data set. Although the above description was focused on aligning two data sets, one will appreciate how the same principles can be followed in order to align more than two different data sets. Indeed, any number of data sets can be aligned one with another in the manner described above.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed. Some acts can be performed in parallel with one another while other acts are performed in serial.

Figure 13:
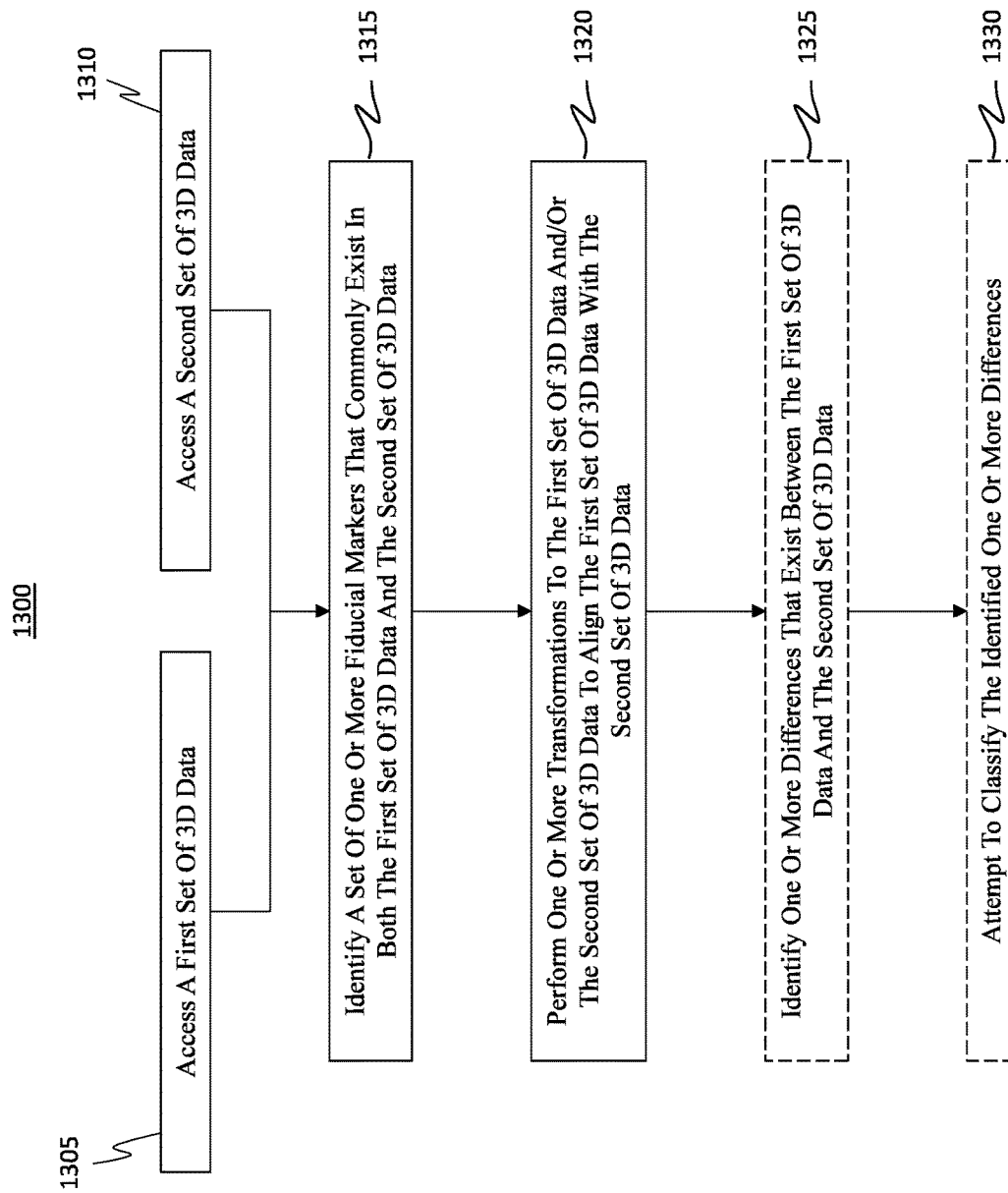
FIG. 13 illustrates a flowchart of an example method for aligning fiducial markers that commonly exist in each of multiple different N-dimensional (N-D) data sets, where the N-D data sets are at least three-dimensional (3D) data sets.

FIG. 13 shows a flowchart of an example method 1300 for aligning fiducial markers that commonly exist in each of multiple different N-dimensional (N-D) data sets. Notably, the N-D data sets are at least three-dimensional (3D) data sets. The method 1300 can be performed by the analysis engine 825 of FIG. 8 and the alignment engine 1115 of FIG. 11.

Method 1300 includes an act (act 1305) of accessing a first set of N-D data. In parallel or in serial with act 1305, there is an act (act 1310) of accessing a second set of N-D data.

As an example, the first set of N-D data can be the 3D data set 805 from FIG. 8, and the second set of N-D data can be the 3D data set 810. Notably, the first set of N-D data and the second set of N-D data at least partially represent a common entity (e.g., at least part of a heat signature of a plane or atmospheric effects or at least part of a wake signature of a ship or at least part of a human's internal organs or any other object).

In some cases, the first set of N-D data and the second set of N-D data are time series data such that the first set of N-D data has a first timestamp and the second set of N-D data has a second timestamp. In some cases, the first set of N-D data is generated by a first camera/sensor of a first modality (e.g., perhaps a low light camera) while the second set of N-D data is generated by a second camera/sensor of a second modality (e.g., perhaps a thermal imaging camera). In this case, the sets of data can be generated at the same time (i.e. the have the same or about the same timestamp). In some cases, however, the two data sets can be generated at different times and using different devices (e.g., they are generated by different sensor types).

Regarding the "access" operation, the data sets can be accessed in different ways. For example, the computer system performing method 1300 can be structured to include sensors that generate the data sets. Because the data sets are generated by the computer itself, the computer then will also have access to those data sets. In some implementations, the data sets might be generated by a sensor or computer device and then stored in storage. That storage might be in the cloud. A computer system can then be provided with permissions so that the computer system can access the data sets over a network interface.

There is then an act (act 1315) of identifying a set of one or more fiducial markers that commonly exist in both the first set of N-D data and the second set of N-D data. For example, the fiducial markers 1010 from FIG. 10 can be identified, and the fiducial markers 1015 can also be identified. Notably, the fiducial markers 1010 and 1015 commonly exist between the two 3D data sets 1000 and 1005. In some cases, the set of one or more fiducial markers includes at least 1 marker, at least 2 markers, at least 3, at least 4, at least 5, at least 6, at least 7, at least 8, at least 9, or at least 10 fiducial markers. In some cases, the number includes more than 100 or more than 1,000 or more than 1,000,000. In some implementations, a machine learning algorithm is employed to identify the one or more fiducial markers. In some implementations, at least one fiducial marker in the set is identified via user input.

In some implementations, the process of identifying the set of one or more fiducial markers that commonly exist in both the first set of 3D data and the second set of 3D data includes performing object segmentation to identify features in the first set of 3D and the second set of 3D data. Once those features are identified, then the embodiments can select fiducial markers for those identified features. Additionally, or alternatively, the process includes performing voxel intensity analysis or even invariant feature detection.

Based on the identified set of one or more fiducial markers, there is an act (act 1320) of performing one or more transformations (e.g., transformations 1120 from FIG. 11) to the first set of N-D data and/or to the second set of N-D data to align the first set of N-D data with the second set of N-D data. This alignment process results in at least a selected number of the common fiducial markers that exist in the second set of N-D data being within a threshold alignment relative to the corresponding common fiducial markers that exist in the first set of N-D data. For example, in FIG. 12D, notice how the fiducial markers are within a threshold distance (three-dimensionally) relative to one another (e.g., the circles overlap one with another). The selected number of aligned fiducial markers can be set to any number (e.g., 1 or any number greater than 1).

Figure 14:
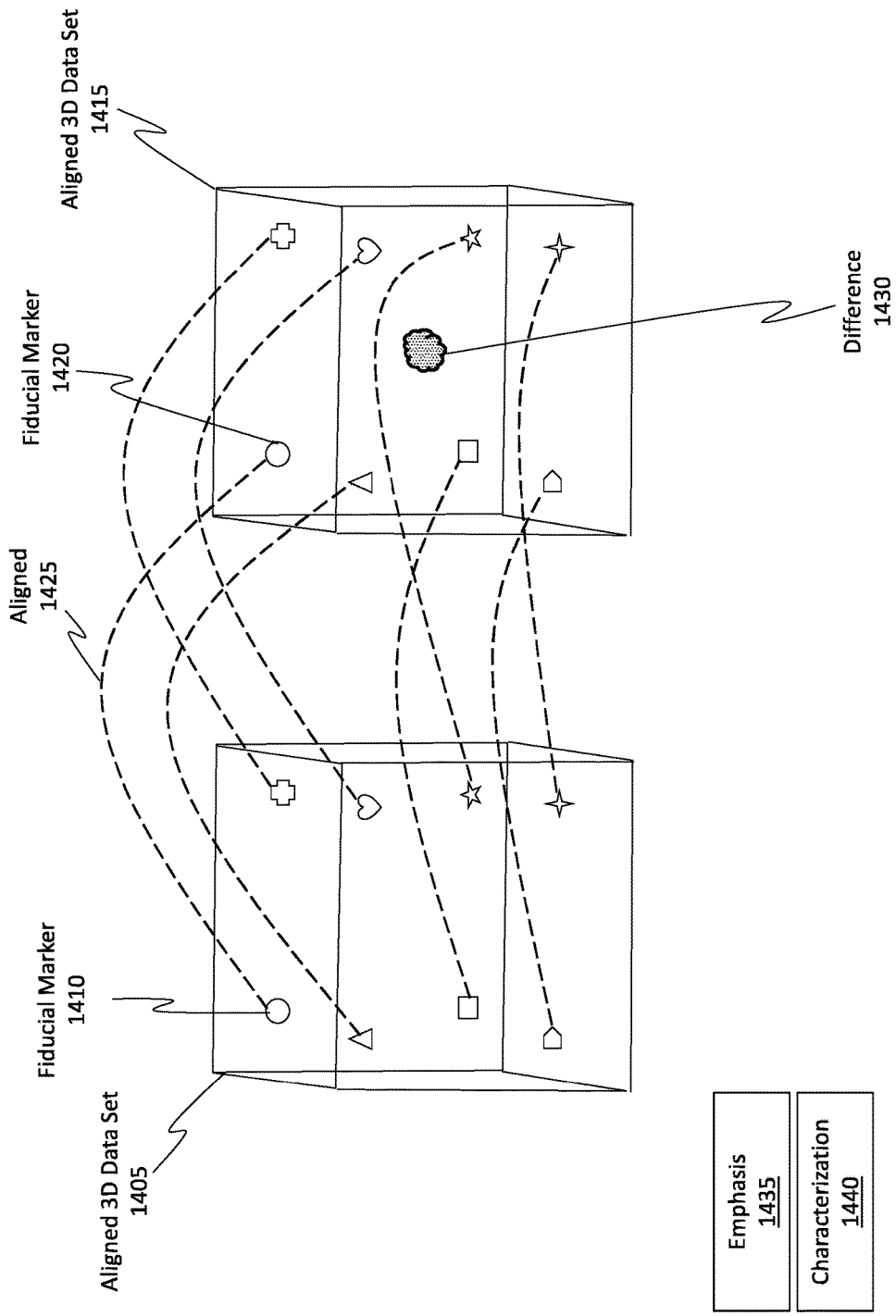
FIG. 14 illustrates an example process for identifying differences or discrepancies that may exist between multiple different data sets that supposedly represent the same or similar object or set of objects.
Figure 15:
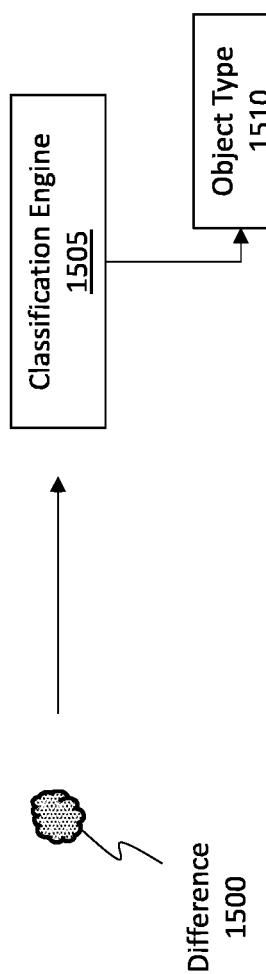
FIG. 15 illustrates an example technique for classifying differences that have been identified from different data sets.

Subsequent to aligning the first set of 3D data with the second set of 3D data, there is an optional act (act 1325, which is optional as indicated by the dashed border) of identifying one or more differences that exist between the first set of 3D data and the second set of 3D data. Another optional act involves attempting (act 1330) to classify the identified one or more differences. FIGS. 14 and 15 are illustrative.

Stated differently, subsequent to aligning the first set of 3D data with the second set of 3D data, the embodiments identify one or more differences that exist between the first set of 3D data and the second set of 3D data. The embodiments can also optionally visually display the first set of 3D data and the second set of 3D data and even visually emphasize the one or more differences.

Notably, the disclosed embodiments refrain from filtering any data from the first set of 3D data and the second set of 3D data. By actively refraining from filtering data, no data will be lost, even when the transformations are performed against the data sets. As such, the embodiments will be able to later identify differences that exist between the data sets. That is, as a result of refraining from filtering the data sets, one or more differences might exist between those data sets, and those differences will be preserved throughout the alignment process. Later, the embodiments will be able to identify and classify the differences to determine what those differences potentially represent.

Identifying and Classifying Differences

After the various different N-D data sets have been aligned based on their fiducial markers, the embodiments are able to identify differences that exist between the different data sets. Because the data sets were purposefully not filtered, one or more differences might exist in those data sets. For instance, if the data sets are time series data and further are medical data, it might be the case that a new growth has emerged and is present in one of the later-dated time sets. The embodiments are able to analyze the different data sets and identify differences, and shown in FIG. 14.

In particular, FIG. 14 shows a process for identifying differences 1400. Notice, there is a first aligned 3D data set 1405 comprising a fiducial marker 1410 and a second aligned 3D data set 1415 comprising a fiducial marker 1420. The 3D data sets have been subjected to any number of transformations to cause their fiducial markers (or at least a selected number of fiducial markers) to be in alignment with one another. For instance, the fiducial marker 1410 is aligned 1425 with the fiducial marker 1420. After the data sets have been sufficiently aligned, the embodiments analyze the data sets to determine whether differences exist.

For example, in the illustration shown in FIG. 14, the aligned 3D data sets 1405 and 1415 have been analyzed and a difference 1430 has been identified as existing in the aligned 3D data set 1415. While only a single difference is illustrated, one will appreciate how any number of differences can be identified. The difference 1430 can be a single data point existing in one of the data sets (in this case, the difference 1430 exists in the aligned 3D data set 1415) while in other cases the difference 1430 can comprise multiple data points that are grouped together.

In some embodiments, data might be classified as being a "difference" only if its characteristics satisfy certain requirements. For instance, for a set of data points to be recognized as being a "difference," some embodiments indicate that a threshold number of data points are to be included or batched together. In other words, a single (or any selected number) data point might not be sufficient to be considered as a difference. In some embodiments, however, a single data point may be sufficient to be recognized as being a "difference."

In some cases, for a set of data points to be recognized as being a "difference," some embodiments attempt to classify the set of data points that form or constitute the supposed difference. If the embodiments are not able to classify the difference, then the data points can optionally be labeled as noise. Alternatively, an alert can be raised in an effort to obtain user input or guidance. In some cases, for a set of data points to be recognized as being a "difference," some embodiments attempt to perform edge detection on the data points in an attempt to identify edges, contours, or features associated with those data points.

In any event, the embodiments are able to emphasize the identified difference(s) in some manner, as shown by emphasis 1435. The emphasis 1435 can include highlighting the data points, pointing an arrow or some indicator at the data points, modifying their appearance (e.g., bold, change in color, change in shape, etc.). The emphasis 1435 can also include sending an alert to a user to identify the data point(s). Additionally, as mentioned earlier, the embodiments can optionally attempt to characterize or identify what those data points represent, as shown by characterization 1440.

As an example, suppose the 3D data sets are of a person's internal organs, and the 3D sets were time series data. The difference 1430 might correspond to a new growth (e.g., a tumor) that has grown in the person since the time when the aligned 3D data set 1405 was generated. In this example case, the embodiments can attempt to classify the data points associated with the difference 1430 as being a new growth and can inform or alert a human user. FIG. 15 provides more detail.

FIG. 15 shows how the data points classified as being a difference 1500 can be fed as input into a classification engine 1505. The other data points in the data set can also be fed as input as well in order to provide a context for the classification engine 1505. The classification engine 1505 can employ any type of machine learning, as discussed above. The classification engine 1505 is able to analyze the features, characteristics, edges, and contours embodied by the data points of the difference 1500 (perhaps with the context provided by the other data points in the data set) to determine an object type 1510 of those data points (e.g., is the object a tumor, a heat signature of a plane (indicating trajectory), a wake signature of a submarine, and so on).

Accordingly, the disclosed embodiments are configured to automatically align multiple N-D data sets with one another. The alignment process is performed by identifying one or more fiducial markers that commonly exist in each of the N-D data sets. Transformations are then applied to the N-D data sets to bring at least a selected number of the identified fiducial markers into alignment or into proximity with one another, where the proximity is based on a threshold distance. Once the N-D data sets are aligned, then the embodiments are beneficially able to identify one or more differences that exist between those data sets. Those differences can then be analyzed and even segmented in an attempt to determine what those differences represent in the real-world.

Example Computer/Computer systems

Figure 16:
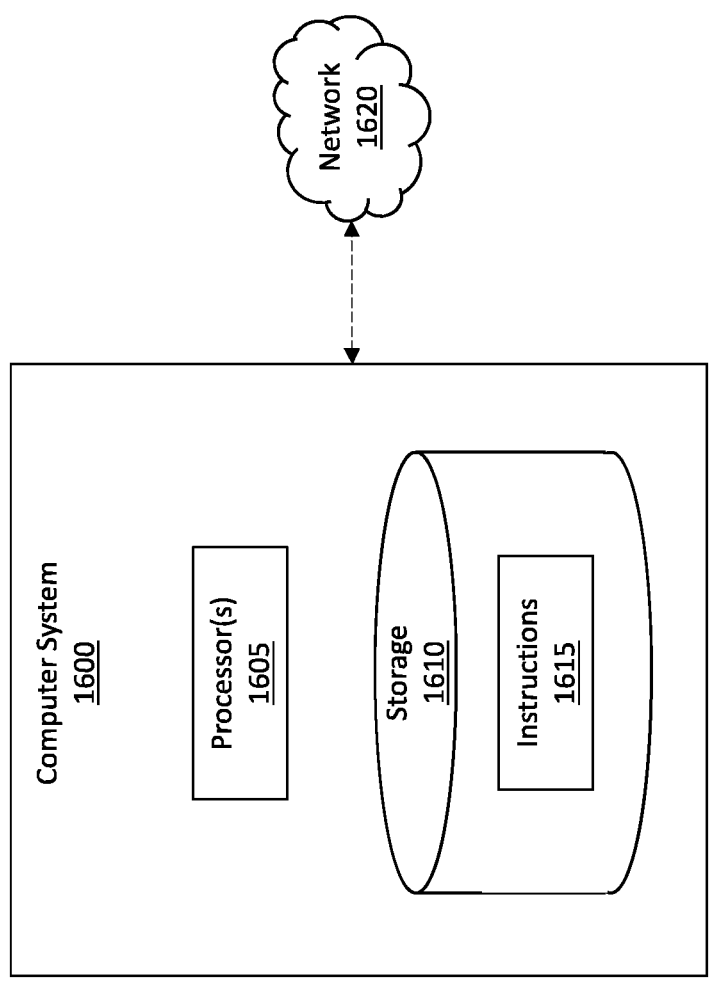
FIG. 16 illustrates an example computer system configured to perform any of the disclosed operations.

Attention will now be directed to FIG. 16 which illustrates an example computer system 1600 that may include and/or be used to perform any of the operations described herein. Computer system 1600 may take various different forms.

For example, computer system 1600 may be embodied as a tablet, a desktop, a laptop, a mobile device, or a standalone device, such as those described throughout this disclosure. Computer system 1600 may also be a distributed system that includes one or more connected computing components/devices that are in communication with computer system 1600.

In its most basic configuration, computer system 1600 includes various different components. FIG. 16 shows that computer system 1600 includes one or more processor(s) 1605 (aka a "hardware processing unit") and storage 1610.

Regarding the processor(s) 1605, it will be appreciated that the functionality described herein can be performed, at least in part, by one or more hardware logic components (e.g., the processor(s) 1605). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," or "engine" can refer to hardware processing units or to software objects, routines, or methods that may be executed on computer system 1600. The different components, modules, engines, and services described herein may be implemented as objects or processors that execute on computer system 1600 (e.g. as separate threads).

Storage 1610 may be physical system memory, which may be volatile, non-volatile, or some combination of the two. The term "memory" may also be used herein to refer to non-volatile mass storage such as physical storage media. If computer system 1600 is distributed, the processing, memory, and/or storage capability may be distributed as well.

Storage 1610 is shown as including executable instructions 1615. The executable instructions 1615 represent instructions that are executable by the processor(s) 1605 of computer system 1600 to perform the disclosed operations, such as those described in the various methods.

The disclosed embodiments may comprise or utilize a special-purpose or general-purpose computer including computer hardware, such as, for example, one or more processors (such as processor(s) 1605) and system memory (such as storage 1610), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Computer-readable media that carry computer-executable instructions are "transmission media." Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1600 may also be connected (via a wired or wireless connection) to external sensors (e.g., one or more remote cameras) or devices via a network 1620. For example, computer system 1600 can communicate with any number devices or cloud services to obtain or process data. In some cases, network 1620 may itself be a cloud network. Furthermore, computer system 1600 may also be connected through one or more wired or wireless networks to remote/separate computer systems(s) that are configured to perform any of the processing described with regard to computer system 1600.

A "network," like network 1620, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1600 will include one or more communication channels that are used to communicate with the network 1620. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for aligning fiducial markers that commonly exist in each of multiple different N-dimensional (N-D) data sets, wherein the N-D data sets are at least three-dimensional (3D) data sets, said method comprising:
   accessing a first set of N-D data;
   accessing a second set of N-D data;
   identifying a set of one or more fiducial markers that commonly exist in both the first set of N-D data and the second set of N-D data; and
   based on the identified set of one or more fiducial markers, perform one or more transformations to the first set of N-D data and/or the second set of N-D data to align the first set of N-D data with the second set of N-D data, wherein said aligning results in at least a selected number of the common fiducial markers that exist in the second set of N-D data being within a threshold alignment relative to the corresponding common fiducial markers that exist in the first set of N-D data.

2. The method of claim 1, wherein the set of one or more fiducial markers includes at least 10 fiducial markers.

3. The method of claim 1, wherein the one or more transformations includes one or more of a rotation transformation, a scaling transformation, and a translation transformation.

4. The method of claim 1, wherein the method further includes:
   subsequent to aligning the first set of N-D data with the second set of N-D data, attempting to identify one or more differences that exist between the aligned first set of N-D data and the aligned second set of N-D data.

5. The method of claim 4, wherein the method further includes:
   in response to identifying the one or more differences, attempting to classify the one or more differences to determine what the one or more differences represent.

6. The method of claim 1, wherein the first set of N-D data and the second set of N-D data represent a common entity, and wherein the first set of N-D data and the second set of N-D data are time series data such that the first set of N-D data has a first timestamp and the second set of N-D data has a second timestamp.

7. The method of claim 1, wherein the first set of N-D data is generated by a first camera of a first modality, and the second set of N-D data is generated by a second camera of a second modality.

8. The method of claim 1, wherein the first set of N-D data and the second set of N-D data are generated by different sensor types.

9. The method of claim 1, wherein a machine learning algorithm identifies the set of one or more fiducial markers.

10. The method of claim 1, wherein at least one fiducial marker in the set of one or more fiducial markers is identified via user input.

11. A computer system configured to align fiducial markers that commonly exist in each of multiple different three-dimensional (3D data sets, said computer system comprising:
   one or more processors; and
   one or more computer-readable hardware storage devices that store instructions that are executable by the one or more processors to cause the computer system to at least:
      access a first set of 3D data;
      access a second set of 3D data;
      identify a set of one or more fiducial markers that commonly exist in both the first set of 3D data and the second set of 3D data; and
      based on the identified set of one or more fiducial markers, perform one or more transformations to the first set of 3D data and/or the second set of 3D data to align the first set of 3D data with the second set of 3D data, wherein said aligning results in at least a selected number of the common fiducial markers that exist in the second set of 3D data being within a threshold alignment relative to the corresponding common fiducial markers that exist in the first set of 3D data.

12. The computer system of claim 11, wherein the first set of 3D data is generated by one or more of a wearable device, a depth sensor, or an infrared (IR) sensor.

13. The computer system of claim 11, wherein the first set of 3-D data is 3D point cloud data or surface reconstruction mesh data or depth map data.

14. The computer system of claim 11, wherein the computer system refrains from filtering any data from the first set of 3D data and the second set of 3D data.

15. The computer system of claim 12, wherein, as a result of refraining from filtering the first set of 3D data and the second set of 3D data, one or more differences exist between the first set of 3D data and the second set of 3D data.

16. The computer system of claim 15, wherein the instructions are further executable to cause the computer system to at least:
   identify and classify the differences to determine what said differences potentially represent.

17. The computer system of claim 11, wherein identifying the set of one or more fiducial markers that commonly exist in both the first set of 3D data and the second set of 3D data includes performing one of:
   object segmentation to identify features in the first set of 3D and the second set of 3D data; or
   voxel intensity analysis; or
   invariant feature detection.

18. The computer system of claim 11, wherein the instructions are further executable to cause the computer system to at least:
   subsequent to aligning the first set of 3D data with the second set of 3D data, identifying one or more differences that exist between the first set of 3D data and the second set of 3D data;
   visually displaying the first set of 3D data and the second set of 3D data; and
   visually emphasizing the one or more differences.

19. A computer system configured to align fiducial markers that commonly exist in each of multiple different three-dimensional (3D data sets, said computer system comprising:
- one or more processors; and
- one or more computer-readable hardware storage devices that store instructions that are executable by the one or more processors to cause the computer system to at least:
- access a first set of 3D data;
- access a second set of 3D data;
- identify a set of one or more fiducial markers that commonly exist in both the first set of 3D data and the second set of 3D data;
- based on the identified set of one or more fiducial markers, perform one or more transformations to the first set of 3D data and/or the second set of 3D data to align the first set of 3D data with the second set of 3D data, wherein said aligning results in at least a selected number of the common fiducial markers that exist in the second set of 3D data being within a threshold alignment relative to the corresponding common fiducial markers that exist in the first set of 3D data; and
- subsequent to aligning the first set of 3D data with the second set of 3D data, identify one or more differences that exist between the first set of 3D data and the second set of 3D data.

20. The computer system of claim 19, wherein the instructions are further executable to cause the computer system to at least:
- attempt to classify the identified one or more differences.

* * * * *